(12) United States Patent
Ouyang et al.

(10) Patent No.: US 10,019,435 B2
(45) Date of Patent: *Jul. 10, 2018

(54) SPACE PREDICTION FOR TEXT INPUT

(71) Applicant: Google Inc., Mountain View, CA (US)

(72) Inventors: Yu Ouyang, San Jose, CA (US);
Shumin Zhai, Los Altos, CA (US)

(73) Assignee: Google LLC, Mountain View, CA (US)

(*) Notice: Subject to any disclaimer, the term of this patent is extended or adjusted under 35 U.S.C. 154(b) by 1010 days.

This patent is subject to a terminal disclaimer.

(21) Appl. No.: 14/452,035

(22) Filed: Aug. 5, 2014

(65) Prior Publication Data
US 2015/0026628 A1 Jan. 22, 2015

Related U.S. Application Data

(63) Continuation of application No. 13/657,574, filed on Oct. 22, 2012, now Pat. No. 8,819,574.

(51) Int. Cl.
G06F 3/0482 (2013.01)
G06F 17/27 (2006.01)
(Continued)

(52) U.S. Cl.
CPC .......... G06F 17/276 (2013.01); G06F 3/0237 (2013.01); G06F 3/0482 (2013.01);
(Continued)

(58) Field of Classification Search
CPC .. G06F 3/04886; G06F 3/0482; G06F 3/0481; G06F 3/0237; G06F 17/276; G06F 17/2294; G06F 17/273; Y10S 715/968
See application file for complete search history.

(56) References Cited

U.S. PATENT DOCUMENTS 4,534,261 A  8/1985 Fabrizio
4,833,610 A  5/1989 Zamora et al.
(Continued)

FOREIGN PATENT DOCUMENTS

CN  1133996 A  10/1996
CN  1761989 A  4/2006
(Continued)

OTHER PUBLICATIONS

Notice of Allowance from U.S. Appl. No. 14/196,552, dated Jun. 18, 2015, 5 pp.
(Continued)

Primary Examiner — Steven Sax
(74) Attorney, Agent, or Firm — Shumaker & Sieffert, P.A.

(57) ABSTRACT

An example method includes displaying, at a presence-sensitive device, a virtual keyboard, receiving an indication of input entered at a presence-sensitive device indicating a plurality of characters, determining a sequence of at least three character strings in the plurality such that the sequence does not include any space characters, modifying the characters by inserting at least two space characters to demarcate the at least three character strings, and determining at least two suggested character strings based on first, second, and third character strings of the sequence. The method further includes outputting, for display at the presence-sensitive device and at a text-suggestion area of the GUI, the at least two suggested character strings, receiving a selection that indicates a selected character string of the at least two suggested character strings, and outputting, for display at the presence-sensitive device and at the text-entry area of the GUI, the selected character string.

17 Claims, 5 Drawing Sheets

(51) Int. Cl.
   *G06F 17/22* (2006.01)
   *G06F 3/023* (2006.01)
   *G06F 3/0488* (2013.01)

(52) U.S. Cl.
   CPC ...... *G06F 3/04886* (2013.01); *G06F 17/2294* (2013.01); *G06F 17/273* (2013.01); *Y10S 715/968* (2013.01)

(56) References Cited

U.S. PATENT DOCUMENTS

| | | |
|---|---|---|
| 4,847,766 A | 7/1989 | McRae et al. |
| 4,988,981 A | 1/1991 | Zimmerman et al. |
| 5,075,896 A | 12/1991 | Wilcox et al. |
| 5,115,482 A | 5/1992 | Stallard et al. |
| 5,307,267 A | 4/1994 | Yang |
| 5,319,747 A | 6/1994 | Gerrissen et al. |
| 5,440,070 A | 8/1995 | Okamoto et al. |
| 5,502,803 A | 3/1996 | Hiroichi et al. |
| 5,521,986 A | 5/1996 | Curtin, II et al. |
| 5,593,541 A | 1/1997 | Wong et al. |
| 5,606,494 A | 2/1997 | Oshima et al. |
| 5,677,710 A | 10/1997 | Thompson-Rohrlich |
| 5,684,873 A | 11/1997 | Tiilikainen |
| 5,717,939 A | 2/1998 | Bricklin et al. |
| 5,748,512 A | 5/1998 | Vargas |
| 5,761,689 A | 6/1998 | Rayson et al. |
| 5,765,180 A | 6/1998 | Travis |
| 5,781,179 A | 7/1998 | Nakajima et al. |
| 5,784,504 A | 7/1998 | Anderson et al. |
| 5,805,167 A | 9/1998 | Van Cruyningen |
| 5,845,306 A | 12/1998 | Schabes et al. |
| 5,848,187 A | 12/1998 | Bricklin et al. |
| 5,903,229 A | 5/1999 | Kishi |
| 5,905,246 A | 5/1999 | Fajkowski |
| 5,917,493 A | 6/1999 | Tan et al. |
| 5,953,541 A | 9/1999 | King et al. |
| 6,008,799 A | 12/1999 | Van Kleeck |
| 6,032,053 A | 2/2000 | Schroeder et al. |
| 6,041,292 A | 3/2000 | Jochim |
| 6,047,300 A | 4/2000 | Walfish et al. |
| 6,057,845 A | 5/2000 | Dupouy |
| 6,061,050 A | 5/2000 | Allport et al. |
| 6,072,473 A | 6/2000 | Muller et al. |
| 6,094,188 A | 7/2000 | Horton et al. |
| 6,131,102 A | 10/2000 | Potter |
| 6,150,600 A | 11/2000 | Buchla |
| 6,160,555 A | 12/2000 | Kang et al. |
| 6,278,453 B1 | 8/2001 | Bodnar |
| 6,286,064 B1 | 9/2001 | King et al. |
| 6,292,179 B1 | 9/2001 | Lee |
| 6,310,634 B1 | 10/2001 | Bodnar et al. |
| 6,340,979 B1 | 1/2002 | Beaton et al. |
| RE37,654 E | 4/2002 | Longo |
| 6,374,210 B1* | 4/2002 | Chu ............... G06F 17/2863 704/9 |
| 6,396,523 B1 | 5/2002 | Segal et al. |
| 6,407,679 B1 | 6/2002 | Evans et al. |
| 6,417,874 B2 | 7/2002 | Bodnar |
| 6,424,983 B1 | 7/2002 | Schabes et al. |
| 6,438,523 B1 | 8/2002 | Oberteuffer et al. |
| 6,512,838 B1 | 1/2003 | Rafii et al. |
| 6,542,170 B1 | 4/2003 | Williams et al. |
| 6,570,557 B1 | 5/2003 | Westerman et al. |
| 6,573,844 B1 | 6/2003 | Venolia et al. |
| 6,630,924 B1 | 10/2003 | Peck |
| 6,674,895 B2 | 1/2004 | Rafii et al. |
| 6,686,931 B1 | 2/2004 | Bodnar |
| 6,789,231 B1 | 9/2004 | Reynar et al. |
| 6,801,190 B1 | 10/2004 | Robinson et al. |
| 6,983,247 B2 | 1/2006 | Ringger et al. |
| 7,028,259 B1 | 4/2006 | Jacobson |
| 7,030,863 B2 | 4/2006 | Longe et al. |
| 7,042,443 B2 | 5/2006 | Woodard et al. |
| 7,075,520 B2 | 7/2006 | Williams |
| 7,088,345 B2 | 8/2006 | Robinson et al. |
| 7,098,896 B2 | 8/2006 | Kushler et al. |
| 7,145,554 B2 | 12/2006 | Bachmann |
| 7,151,530 B2 | 12/2006 | Roeber et al. |
| 7,170,430 B2 | 1/2007 | Goodgoll |
| 7,199,786 B2 | 4/2007 | Suraqui |
| 7,207,004 B1 | 4/2007 | Harrity |
| 7,231,343 B1 | 6/2007 | Treadgold et al. |
| 7,250,938 B2 | 7/2007 | Kirkland et al. |
| 7,251,367 B2 | 7/2007 | Zhai |
| 7,277,088 B2 | 10/2007 | Robinson et al. |
| 7,296,019 B1 | 11/2007 | Chandrasekar et al. |
| 7,336,827 B2 | 2/2008 | Geiger et al. |
| 7,366,983 B2 | 4/2008 | Brill et al. |
| 7,382,358 B2 | 6/2008 | Kushler et al. |
| 7,453,439 B1 | 11/2008 | Kushler et al. |
| 7,479,949 B2 | 1/2009 | Jobs et al. |
| 7,487,461 B2 | 2/2009 | Zhai et al. |
| 7,508,324 B2 | 3/2009 | Suraqui |
| 7,542,029 B2 | 6/2009 | Kushler |
| 7,706,616 B2 | 4/2010 | Kristensson et al. |
| 7,716,579 B2 | 5/2010 | Gunn et al. |
| 7,730,402 B2 | 6/2010 | Song |
| 7,750,891 B2 | 7/2010 | Stephanick et al. |
| 7,809,719 B2 | 10/2010 | Furuuchi et al. |
| 7,831,423 B2 | 11/2010 | Schubert |
| 7,880,730 B2 | 2/2011 | Robinson et al. |
| 7,886,233 B2 | 2/2011 | Rainisto et al. |
| 7,895,518 B2 | 2/2011 | Kristensson |
| 7,907,125 B2 | 3/2011 | Weiss et al. |
| 7,920,132 B2 | 4/2011 | Longe et al. |
| 7,921,361 B2 | 4/2011 | Gunn et al. |
| 7,973,770 B2 | 7/2011 | Tokkonen |
| 8,036,878 B2 | 10/2011 | Assadollahi |
| 8,059,101 B2 | 11/2011 | Westerman et al. |
| 8,135,582 B2 | 3/2012 | Suraqui |
| 8,232,972 B2 | 7/2012 | Huang et al. |
| 8,232,973 B2 | 7/2012 | Kocienda et al. |
| 8,266,528 B1 | 9/2012 | Hayes |
| 8,280,886 B2 | 10/2012 | Labrou et al. |
| 8,359,543 B2 | 1/2013 | Sengupta |
| 8,438,160 B2 | 5/2013 | Aravamudan et al. |
| 8,504,349 B2 | 8/2013 | Manu et al. |
| 8,514,178 B2 | 8/2013 | Song et al. |
| 8,542,206 B2 | 9/2013 | Westerman et al. |
| 8,552,984 B2 | 10/2013 | Knaven |
| 8,587,542 B2 | 11/2013 | Moore |
| 8,619,048 B2 | 12/2013 | Shimoni |
| 8,667,414 B2 | 3/2014 | Zhai et al. |
| 8,701,032 B1 | 4/2014 | Zhai et al. |
| 8,782,549 B2 | 7/2014 | Ouyang et al. |
| 8,819,574 B2* | 8/2014 | Ouyang ............... G06F 3/0482 715/773 |
| 8,843,845 B2 | 9/2014 | Ouyang et al. |
| 8,850,350 B2 | 9/2014 | Bi et al. |
| 2002/0000468 A1* | 1/2002 | Bansal ............... G06F 17/30879 235/462.15 |
| 2002/0013794 A1 | 1/2002 | Carro et al. |
| 2002/0015064 A1 | 2/2002 | Robotham et al. |
| 2002/0129012 A1 | 9/2002 | Green |
| 2002/0143543 A1 | 10/2002 | Sirivara |
| 2002/0194223 A1 | 12/2002 | Meyers et al. |
| 2003/0006967 A1 | 1/2003 | Pihlaja |
| 2003/0095053 A1 | 5/2003 | Kandogan et al. |
| 2003/0095104 A1 | 5/2003 | Kandogan et al. |
| 2003/0097252 A1 | 5/2003 | Mackie |
| 2003/0165801 A1 | 9/2003 | Levy |
| 2004/0120583 A1 | 6/2004 | Zhai |
| 2004/0140956 A1 | 7/2004 | Kushler et al. |
| 2005/0052406 A1 | 3/2005 | Steiphanick et al. |
| 2005/0114115 A1 | 5/2005 | Karidis et al. |
| 2005/0146508 A1 | 7/2005 | Kirkland et al. |
| 2005/0171783 A1 | 8/2005 | Suominen |
| 2005/0190973 A1 | 9/2005 | Kristensson et al. |
| 2006/0004638 A1 | 1/2006 | Royal et al. |
| 2006/0026536 A1 | 2/2006 | Hotelling et al. |
| 2006/0028450 A1 | 2/2006 | Suraqui |
| 2006/0050962 A1 | 3/2006 | Geiger et al. |
| 2006/0053387 A1 | 3/2006 | Ording |

(56) References Cited

U.S. PATENT DOCUMENTS

| | | |
|---|---|---|
| 2006/0055669 A1 | 3/2006 | Das |
| 2006/0119582 A1 | 6/2006 | Ng et al. |
| 2006/0173674 A1 | 8/2006 | Nakajima et al. |
| 2006/0176283 A1 | 8/2006 | Suraqui |
| 2006/0253793 A1 | 11/2006 | Zhai et al. |
| 2006/0256139 A1 | 11/2006 | Gikandi |
| 2006/0265648 A1 | 11/2006 | Rainisto et al. |
| 2007/0016862 A1 | 1/2007 | Kuzmin |
| 2007/0040813 A1 | 2/2007 | Kushler et al. |
| 2007/0083276 A1 | 4/2007 | Song |
| 2007/0089070 A1 | 4/2007 | Jaczyk |
| 2007/0094024 A1 | 4/2007 | Kristensson et al. |
| 2007/0152980 A1 | 7/2007 | Kocienda et al. |
| 2007/0213983 A1 | 9/2007 | Ramsey |
| 2008/0017722 A1 | 1/2008 | Snyder et al. |
| 2008/0100579 A1 | 5/2008 | Robinson et al. |
| 2008/0122796 A1 | 5/2008 | Jobs et al. |
| 2008/0144062 A1* | 6/2008 | Nakatsuka ............ G06F 17/214 358/1.11 |
| 2008/0167858 A1 | 7/2008 | Christie et al. |
| 2008/0172293 A1 | 7/2008 | Raskin et al. |
| 2008/0229255 A1 | 9/2008 | Linjam et al. |
| 2008/0232885 A1 | 9/2008 | Mock et al. |
| 2008/0240551 A1 | 10/2008 | Zitnick et al. |
| 2008/0270896 A1 | 10/2008 | Kristensson |
| 2008/0316183 A1 | 12/2008 | Westerman et al. |
| 2009/0058823 A1 | 3/2009 | Kocienda |
| 2009/0077464 A1 | 3/2009 | Goldsmith et al. |
| 2009/0100338 A1 | 4/2009 | Saetti |
| 2009/0100383 A1 | 4/2009 | Sunday et al. |
| 2009/0119376 A1 | 5/2009 | Bomma |
| 2009/0189864 A1 | 7/2009 | Walker et al. |
| 2009/0249198 A1 | 10/2009 | Davis et al. |
| 2010/0021871 A1 | 1/2010 | Layng et al. |
| 2010/0029910 A1 | 2/2010 | Shiba et al. |
| 2010/0070908 A1 | 3/2010 | Mori et al. |
| 2010/0079382 A1 | 4/2010 | Suggs |
| 2010/0125594 A1 | 5/2010 | Li et al. |
| 2010/0131447 A1 | 5/2010 | Cruetz et al. |
| 2010/0141484 A1 | 6/2010 | Griffin et al. |
| 2010/0199226 A1 | 8/2010 | Nurmi |
| 2010/0235780 A1 | 9/2010 | Westerman et al. |
| 2010/0238125 A1 | 9/2010 | Ronkainen |
| 2010/0257478 A1 | 10/2010 | Longe et al. |
| 2010/0259493 A1 | 10/2010 | Chang et al. |
| 2010/0271299 A1 | 10/2010 | Stephanick et al. |
| 2010/0315266 A1 | 12/2010 | Gunawardana et al. |
| 2011/0010174 A1 | 1/2011 | Longe et al. |
| 2011/0061017 A1 | 3/2011 | Ullrich et al. |
| 2011/0063224 A1 | 3/2011 | Vexo et al. |
| 2011/0063231 A1 | 3/2011 | Jakobs et al. |
| 2011/0066984 A1 | 3/2011 | Li |
| 2011/0071834 A1 | 3/2011 | Kristensson et al. |
| 2011/0103682 A1 | 5/2011 | Chidloyskii et al. |
| 2011/0107206 A1 | 5/2011 | Walsh et al. |
| 2011/0119617 A1 | 5/2011 | Kristensson |
| 2011/0122081 A1 | 5/2011 | Kushler |
| 2011/0141027 A1 | 6/2011 | Ghassabian |
| 2011/0141031 A1 | 6/2011 | Mccullough |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0193797 A1 | 8/2011 | Unruh |
| 2011/0202834 A1 | 8/2011 | Mandryk et al. |
| 2011/0202836 A1 | 8/2011 | Badger et al. |
| 2011/0205160 A1 | 8/2011 | Song et al. |
| 2011/0208511 A1 | 8/2011 | Sikstrom et al. |
| 2011/0208513 A1 | 8/2011 | Nicks et al. |
| 2011/0209088 A1 | 8/2011 | Hinckley et al. |
| 2011/0210850 A1 | 9/2011 | Tran |
| 2011/0234524 A1 | 9/2011 | Longe et al. |
| 2011/0242000 A1 | 10/2011 | Bi et al. |
| 2011/0254798 A1 | 10/2011 | Adamson et al. |
| 2011/0291940 A1 | 12/2011 | Ghassabian |
| 2012/0011462 A1 | 1/2012 | Westerman et al. |
| 2012/0029910 A1 | 2/2012 | Medlock et al. |
| 2012/0036468 A1 | 2/2012 | Colley |
| 2012/0036469 A1 | 2/2012 | Suraqui |
| 2012/0036485 A1 | 2/2012 | Watkins, Jr. et al. |
| 2012/0075190 A1 | 3/2012 | Sengupta |
| 2012/0079412 A1 | 3/2012 | Kocienda |
| 2012/0098846 A1 | 4/2012 | Wun et al. |
| 2012/0113008 A1 | 5/2012 | Makinen et al. |
| 2012/0127080 A1 | 5/2012 | Kushler et al. |
| 2012/0127082 A1 | 5/2012 | Kushler et al. |
| 2012/0131035 A1 | 5/2012 | Yang et al. |
| 2012/0131514 A1 | 5/2012 | Ansell et al. |
| 2012/0162092 A1 | 6/2012 | Pasquero et al. |
| 2012/0166428 A1 | 6/2012 | Kakade et al. |
| 2012/0223889 A1 | 9/2012 | Medlock et al. |
| 2012/0242579 A1 | 9/2012 | Chua |
| 2012/0259615 A1 | 10/2012 | Morin et al. |
| 2012/0274745 A1 | 11/2012 | Russell |
| 2012/0290946 A1 | 11/2012 | Schrock et al. |
| 2012/0310626 A1 | 12/2012 | Kida et al. |
| 2013/0034302 A1* | 2/2013 | Sata .................. G06K 9/3216 382/182 |
| 2013/0046544 A1 | 2/2013 | Kay et al. |
| 2013/0074014 A1 | 3/2013 | Ouyang et al. |
| 2013/0082824 A1 | 4/2013 | Colley |
| 2013/0120266 A1 | 5/2013 | Griffin et al. |
| 2013/0120430 A1 | 5/2013 | Li et al. |
| 2013/0125034 A1 | 5/2013 | Griffin et al. |
| 2013/0135209 A1 | 5/2013 | Zhai et al. |
| 2013/0176228 A1 | 7/2013 | Griffin et al. |
| 2013/0205242 A1 | 8/2013 | Colby |
| 2013/0212515 A1 | 8/2013 | Eleftheriou |
| 2013/0332822 A1* | 12/2013 | Willmore ............. G06F 17/273 715/257 |
| 2014/0098023 A1 | 4/2014 | Zhai et al. |
| 2014/0201671 A1 | 7/2014 | Zhai et al. |
| 2014/0372119 A1* | 12/2014 | Parada ............ G06F 17/30899 704/246 |

FOREIGN PATENT DOCUMENTS

| | | |
|---|---|---|
| CN | 100472600 C | 3/2009 |
| CN | 101390039 A | 3/2009 |
| CN | 101393506 A | 3/2009 |
| CN | 101634919 A | 1/2010 |
| CN | 101689189 A | 3/2010 |
| CN | 101788855 A | 7/2010 |
| CN | 102411477 A | 4/2012 |
| CN | 102508553 A | 6/2012 |
| CN | 102541304 A | 7/2012 |
| CN | 102576255 A | 7/2012 |
| CN | 102629158 A | 8/2012 |
| CN | 102693090 A | 9/2012 |
| EP | 0844570 A2 | 5/1998 |
| EP | 1603014 A1 | 7/2005 |
| EP | 1860576 A1 | 11/2007 |
| EP | 1887451 A3 | 2/2008 |
| EP | 2369446 A2 | 9/2011 |
| TW | 201040793 A1 | 11/2010 |
| WO | 2004066075 A2 | 8/2004 |
| WO | 2005064587 A2 | 7/2005 |
| WO | 2007/017660 | 2/2007 |
| WO | 2007017660 A2 | 2/2007 |
| WO | 2008013658 A2 | 1/2008 |
| WO | 2011113057 A1 | 9/2011 |
| WO | 2013107998 A1 | 7/2013 |

OTHER PUBLICATIONS

Prosecution History from U.S. Appl. No. 14/196,552, filed May 7, 2014-Sep. 17, 2014, 28 pgs.

Prosecution History from U.S. Appl. No. 13/787,513, filed Jun. 20, 2013-Mar. 11, 2014, 32 pgs.

Prosecution History from U.S. Appl. No. 13/657,574, filed Feb. 7, 2013-Apr. 14, 2014, 70 pgs.

Office Action from U.S. Appl. No. 14/196,552, dated May 7, 2014, 9 pp.

(56) References Cited

OTHER PUBLICATIONS

Alkanhal, et al., "Automatic Stochastic Arabic Spelling Correction with Emphasis on Space Insertions and Deletions," IEEE Transactions on Audio, Speech, and Language Processing, vol. 20(7), Sep. 2012, 12 pp.

Kane et al., "TrueKeys: Identifying and Correcting Typing Errors for People with Motor Impairments," Proceedings of the 13th International Conference on Intelligent User Interfaces, IUI '08, Jan. 13, 2008, 4 pp.

Karch, "Typing, Copy, and Search," Android Tablets Made Simple, Nov. 18, 2011, 13 pp.

Naseem, "A Hybrid Approach for Urdu Spell Checking, MS Thesis, National University of Computer & Emerging Sciences", retrieved from the internet http://www.cle.org.pk/Publication/theses/2004/a_hybrid_approach_for_Urdu_spell_checking.pdf, Nov. 1, 2004, 87 pp.

International Search Report and Written Opinion of international application No. PCT/US2013/066198, dated Jan. 22, 2014, 14 pp.

Responsive amendment from U.S. Appl. No. 13/787,513, dated Sep. 20, 2013, 11 pages.

Li, "Protractor: A Fast and Accurate Gesture Recognizer" CHI 2010, Apr. 10-15, 2010, Atlanta, Georgia, pp. 2169-2172.

SlideIT Soft Keyboard, SlideIT [online], First accessed on Jan. 31, 2012, retrieved from the Internet: https://play.google.com/store/apps/details?id=com.dasur.slideit.vt.lite&hl=en>, 4 pp.

"Swipe Nuance Home, Type Fast, Swipe Faster," found at http://www.swipe.com/, accessed on May 25, 2012, 1 p.

Tappert et al., "The State of the Art in On-Line Handwriting Recognition," IEEE Transactions on Pattern Analysis and Machine Intelligence, vol. 12, No. 8, Aug. 1990, pp. 787-808.

Wobbrock et al., "$1 Unistroke Recognizer in JavaScript," [online], first accessed on Jan. 24, 2012, retrieved from the Internet: http://depts.washington.edu/aimgroup/proj/dollar/>, 2 pp.

Wobbrock et al., "Gestures without Libraries, Toolkits or Training: A $1 Recognizer for User Inter face Prototypes," UIST 2007, Proceedings of the 20th Annual ACM Symposium on User Interface Software and Technology, pp. 159-168.

Swiftkey, "Swiftkey 3 Keyboard" retrieved from https://play.google.com/store/apps/detais, accessed on Jul. 17, 212, 3 pp.

U.S. Appl. No. 13/646,521, by Shumin Zhai, filed Oct. 5, 2012.

U.S. Appl. No. 13/734,810, by Yu Ouyang, filed Jan. 24, 2013.

U.S. Appl. No. 13/592,131, by Shuman Zhai, filed Aug. 22, 2012.

U.S. Appl. No. 13/793,825, by Xiaojun Bi, filed Mar. 11, 2013.

U.S. Appl. No. 13/858,684, by Yu Ouyang, filed Apr. 8, 2013.

U.S. Appl. No. 60/430,338, by Daniel Suraqui, filed Nov. 29, 2002.

U.S. Appl. No. 60/505,724, by Daniel Suraqui, filed Sep. 22, 2003.

Lomas, "Hey Apple, What the Next iPhone Really, Really Needs Is a Much Better Keyboard," http://techcrunch.com/2013/04/21/the-iphone-keyboard-stinks/?, Apr. 21, 2013, 6 pgs.

ShapeWriter Research Project home page, accessed May 25, 2012, found at http://www.almaden.ibm.com/u/zhai/shapewriter_research.htm, 12 pp.

Young et al., "Token Passing: a Simple Conceptual Model for Connected Speech Recognition Systems," Cambridge University Engineering Department, Jul. 31, 1989, 23 pp.

Split Keyboard for iPad [Concept], by Skipper Eye, Apr. 23, 2010, found at http://www.redmondpie.com/split-keyboard-for-ipad-9140675/, 6 pp.

Split Keyboard for Thumb Typing Coming to iPad with iOS 5, by Kevin Purcell, Jun. 6, 2011, found at http://www.gottabemobile.com/2011/06/06/split-keyboard-for-thumb-typing-coming-to-ipad-with-ios-5/, 8 pp.

7 Swype keyboard tips for better Swyping, by Ed Rhee, found at http://howto.cnet.com/8301-11310_39-20070627-285/7-swype-keyboard-tips-for-better-swyping/, posted Jun. 14, 2011, 5 pp.

Keymonk—The Future of Smartphone Keyboards, found at www.keymonk.com, downloaded Sep. 5, 2012, 2 pp.

Keymonk Keyboard Free—Android Apps on Google Play, Description, found at https://play.google.com/store/apps/details?id=com.keymonk.latin&hl=en, downloaded Oct. 3, 2012, 2 pp.

Keymonk Keyboard Free—Android Apps on Google Play, User Reviews, found at https://play.google.com/store/apps/details?id=com.keymonk.latin&hl=en, downloaded Oct. 3, 2012, 2 pp.

Keymonk Keyboard Free—Android Apps on Google Play, What's New, found at https://play.google.com/store/apps/details?id=com.keymonk.latin&hl=en, downloaded Oct. 3, 2012, 2 pp.

Keymonk Keyboard Free—Android Apps on Google Play, Permissions, found at https://play.google.com/store/apps/details?id=com.keymonk.latin&hl=en, downloaded Oct. 3, 2012, 2 pp.

ShapeWriter Keyboard allows you to input on Android the same experience with on PC, Android forums, found at talkandroid.com/.../2767-shapewriter-keyboard-allows-you-input-android-same-experience-pc.html, last updated Oct. 25, 2009, 3 pp.

ShapeWriter vs Swype Keyboard, DroidForums.net, found at www.droidforums.net/forum/droid-applications/48707-shapewriter-vs-swype-keyboard.html, last updated Jun. 1, 2010, 5 pp.

Advanced tips for Swype, found at www.swype.com/tips/advanced-tips/, downloaded Aug. 20, 2012, 3 pp.

Welcome to CooTek—TouchPal, an innovative soft keyboard, TouchPal v1.0 for Android will Release Soon!, found at www.cootek.com/intro-android.aspx, downloaded Aug. 20, 2012, 2 pp.

Dasur Pattern Recognition Ltd. SlideIT Keyboard—User Guide, Jul. 2011, found at http://www.mobiletextinput.com/App_Open/Manual/SlideIT_UserGuide%5BEnglish%5Dv4.0.pdf, 21 pp.

Why your typing sucks on Android, and how to fix it, by Martin Bryant, Mar. 3, 2010, found at thenextweb.com/mobile/2010/03/03/typing-sucks-android-fix/, 3 pp.

Avoid iPhone navigation and typing hassles, by Ted Landau, Dec. 28, 2007, found at www.macworld.com/article/1131264/tco_iphone.html, 9 pp.

Kristensson et al., "Command Strokes with and without Preview: Using Pen Gestures on Keyboard for Command Selection," CHI Proceedings, San Jose, CA, USA, Apr. 28-May 3, 2007, 10 pp.

How to Type Faster with the Swype Keyboard for Android—How-To Geek, found at www.howtogeek.com/106643/how-to-type-faster-with-the-swype-keyboard-for-android/, downloaded Jun. 4, 2012, 13 pp.

Android OS—Language & keyboard settings, found at support.google.com/ics/nexus/bin/answer.py?hl=en&answer=168584, downloaded Jun. 4, 2012, 3 pp.

Nuance Supercharges Swype, Adds New Keyboard Options, XT9 Predictive Text, and Dragon-Powered Voice Input, found at http://techcrunch.com/2012/06/20/nuance-supercharges-swype-adds-new-keyboard-options-xt9-predictive-text-and-dragon-powered-voice-input/, downloaded Jun. 20, 2012, 2 pp.

Sensory Software—Text Chat, found at www.sensorysoftware.com/textchat.html, downloaded Jun. 4, 2012, 3 pp.

Swype—Swype Basics, found at www.swype.com/tips/swype-basics/, downloaded Jun. 8, 2012, 2 pp.

Williamson et al., "Hex: Dynamics and Probabilistic Text Entry," Switching and Learning LNCS 3355, pp. 333-342, 2005.

Kristensson et al,. "Shark2: A Large Vocabulary Shorthand Writing System for Pen-based Computers," UIST, vol. 6, issue 2, Oct. 24-27, 2004.

CiteSeer, "Token Passing: a Simple Conceptual Model for Connected Speech Recognition Systems" (1989), by S.J. Young et al., found at (http://citeseerx.ist.psu.edu/viewdoc/summary?doi=10.1.1.17.7829), accessed on Apr. 30, 2012, 2 pp.

Swiftkey 3 Keyboard—Android Apps on Google Play, found at https://play.google.com/store/apps/details?id=com.touchtype.swiftkey&hl=en, accessed on Jun. 8, 2012, 2 pp.

"SwiftKey Counters Swipe with a Smarter Version, Makes an In-Road Into Healthcare Market" by Mike Butcher, found at http://techcrunch.com/2012/06/21/swiftkey-counters-swype-with-a-smarter-version-makes-an-in-road-into-healthcare-market/, Jun. 21, 2012, 1 p.

Response to Office Action dated Mar. 10, 2016, from U.S. Appl. No. 14/851,759, filed May 20, 2016, 11 pp.

Notification of First Office Action from Chinese Application No. 201380054132.6, dated Nov. 20, 2015 18 pgs.

U.S. Appl. No. 13/787,513, by Shuman Zhai, filed Mar. 6, 2013.

(56) References Cited

OTHER PUBLICATIONS

"SwiftKey 3 Keyboard—Android Apps on Google Play," found at web.archive.org/web/20121020153209/https://play.google.com/store/apps/details?id=com.touchtype.swiftkey&hl=en, accessed on Oct. 20, 2012, 4 pp.

"SwiftKey 3 Keyboard—Android Apps on Google Play," found at web.archive.org/web/20121127141326/https://play.google.com/store/apps/details?id=com.touchtype.swiftkey&hl=en, accessed on Nov. 27, 2012, 4 pp.

Non-Final Office Action from U.S. Appl. No. 13/787,513, dated Jun. 20, 2013, 11 pp.

Swiftkey, "SwiftKey 3 Keyboard," retrieved from https://play.google.com/store/apps/details, accessed on Jul. 17, 2012, 3 pp.

Second Office Action, and translation thereof, from counterpart Chinese Application No. 201380055025.5, dated Apr. 10, 2017, 9 pp.

Office Action from U.S. Appl. No. 15/264,876, dated Mar. 10, 2017, 10 pp.

Response to Office Action dated Mar. 10, 2017, from U.S. Appl. No. 15/264,876, filed May 12, 2017, 12 pp.

Office Action from U.S. Appl. No. 14/851,759, dated Mar. 10, 2016, 7 pp.

Notice of Allowance from U.S. Appl. No. 14/851,759, dated Jul. 15, 2016, 5 pp.

First Office Action, and translation thereof, from counterpart Chinese Patent Application No. 2016081501555200, dated Aug. 18, 2016, 22 pp.

Text input for future computing devices (SHARK shorthand and ATOMIK). SHARK Shorthand Home Page, retrieved from http://www.almaden.ibm.com/u/zhai/lopics/virtualkeyboard.htm, accessed on Sep. 20, 2012, 4 pp.

Accot et al., "Refining Fitts' Law Models for Bivariate Pointing," IBM Almaden Research Center, Paper: Pointing and Manipulating, Apr. 5-10, 2003, pp. 193-200.

Bellegarda, Statistical Language Model Adaptation: Review and Perspectives, Speech Communication 42, Jan. 2004, pp. 93-108.

Goodman et al., Language Modeling for Soft Keyboards, Proceedings of the 7th International Conference on Intelligent user interfaces, Jan. 13-16, 2002, pp. 194-195.

Goodman, "A Bit of Progress in Language Modeling Extended Version," Machine Learning and Applied Statistics Group, Microsoft Corporation, Aug. 2001, 73 pp.

Goodman, "A bit of progress in Language Modeling," Computer Speech & Language, Oct. 2001, pp. 403-434.

Gunawardana et al., "Usability Guided Key-Target Resizing for Soft Keyboards," Proceedings of the 15th International Conference on Intelligent user interfaces, Feb. 7-10, 2010, pp. 111-118.

Harb et al., "Back-off Language Model Compression," Google Inc., 2009, 4 pp.

Kristensson et al., "Relaxing Stylus Typing Precision by Geometric Pattern Matching," Proceedings of the 1oth International Conference on Intelligent User Interfaces, Jan. 9-12, 2005, pp. 151-158.

MacKenzie et al., "LetterWise: Prefix-based Disambiguation for Mobile Text Input," Proceedings of the 14th Annual ACM Symposium on User Interface Software and Technology, Nov. 11-14, 2001, pp. 111-120.

Mohri et al., "Speech Recognition With Weighted Finite-State Transducers," Springer Handbook on Speech Processing and Speech Communication, 2008, 31 pp.

Rybach et al., "Silence is Golden: Modeling Non-speech Events in West-Based Dynamic Network Decoders," Human Language Technology and Pattern Recognition, Computer Science Department RWTH Aachen University, Mar. 2012, 4pp.

Youtube, "Automatic error correction on graphical keyboard," Retrieved from http://www.youtube.com/watch?v=_VgYrz7Pi60, Uploaded on Jun. 14, 2007, 1 p.

Youtube, "BlindType—Demo 1 ," Retrieved from http://www.youtube.com/watch?v=M9b8NIMd79w, Uploaded on Jul. 17, 2010, 1 p.

Youtube, "BlindType—Demo 2," Retrieved from http://www.youtube.com/watch?v=7gDF4ocLhQM, Uploaded on Aug. 2, 2010, 1 p.

Youtube, "BlindType on Android," Retrieved from http://www.youtube.com/watch?v=m6eKm1gUnTE, Uploaded on Aug. 7, 2010, 1 p.

Youtube, "BlindType—Thank you!," Retrieved from http://www.youtube.com/watch?v=KTw4JexFW-o, Uploaded on Jul. 22, 2010, 1 p.

Zhai et al., "In search of effective text input interfaces for off the desktop computing," Interacting with Computers 17, Feb. 20, 2004, pp. 229-250.

Notice of Allowance from U.S. Appl. No. 14/196,552, dated Feb. 2, 2015, 5 pp.

Notification on the Grant of Patent from counterpart Chinese application 201380055025.5, dated Aug. 2, 2017, 9 pgs.

Office Action from U.S. Appl. No. 14/196,552, dated Mar. 13, 2015, 10 pp.

Response to Office Action dated Mar. 13, 2015, from U.S. Appl. No. 14/196,552, filed Apr. 23, 2015, 3 pp.

International Preliminary Report on Patentability from International Application No. PCT/US2013/066198, dated May 7, 2015, 10 pp.

* cited by examiner

SPACE PREDICTION FOR TEXT INPUT

This application is a continuation of U.S. application Ser. No. 13/657,574, filed Oct. 22, 2012, the entire content of which is incorporated herein by reference.

BACKGROUND

Computing devices (e.g., mobile phones, tablet computers) may provide a graphical keyboard as part of a graphical user interface for composing text using a presence-sensitive screen. The graphical keyboard may enable a user of the computing device to enter text (e.g., an e-mail, a text message, or a document). For instance, a computing device may present a graphical, or virtual, keyboard at the presence-sensitive display that permits the user to enter data by tapping virtual keys on the graphical keyboard display.

SUMMARY

An example method includes outputting, for display at a presence-sensitive device operatively coupled to a computing device and at a keyboard area of a graphical user interface (GUI), a virtual keyboard including a plurality of keys, and receiving, by the computing device, an indication of an input entered at the presence-sensitive device, the input indicating a plurality of characters and determining, by the computing device, a sequence of at least three character strings included in the plurality of characters, such that the sequence of at least three character strings does not include any space characters. The method further includes modifying, by the computing device, the plurality of characters by inserting at least two space characters within the plurality of characters to demarcate the at least three character strings from one another, and determining, by the computing device, at least two suggested character strings based at least in part on a first character string, a second character string and a third character string of the sequence of at least three character strings. The method further includes outputting, for display at the presence-sensitive device and at a text-suggestion area of a GUI, the at least two suggested character strings, receiving a selection that indicates a selected character string of the at least two suggested character strings, and outputting, for display at the presence-sensitive device and at a text-entry area of the GUI, the selected character string.

In another example, a computing device is operatively coupled to a presence-sensitive device, and includes a memory, and one or more processors. The one or more processors are configured to output, for display at the presence-sensitive device and at a keyboard are of a graphical user interface (GUI), a virtual keyboard including a plurality of keys, receive an indication of an input entered at the presence-sensitive device, the input indicating a plurality of characters, and to determine a sequence of at least three character strings included in the plurality of characters, such that the sequence of at least three character strings does not include any space characters. The processor(s) are further configured to modify the plurality of characters by inserting at least two space characters within the plurality of characters to demarcate the at least three character strings from one another, and to determine at least two suggested character strings based at least in part on a first character string, a second character string and a third character string of the sequence of at least three character strings. The one or more processors are further configured to output, for display at the presence-sensitive device and at a text-suggestion area of the GUI, the at least two suggested character strings, receive a selection that indicates a selected character string of the at least two suggested character strings, and output, for display at the presence-sensitive device and at a text-entry area of the GUI, the selected character string.

In another example, a computer-readable storage medium is encoded with instructions. The instructions, when executed, cause a processor of a computing device to perform operations. The operations include outputting, for display at a presence-sensitive device operatively coupled to the computing device and at a keyboard area of a graphical user interface (GUI), a virtual keyboard including a plurality of keys, receiving, by the computing device, an indication of an input entered at the presence-sensitive device, the input indicating a plurality of characters and determining, by the computing device, at least three character strings included in the plurality of characters, such that the sequence of at least three character strings does not include any space characters. The operations further include modifying, by the computing device, the plurality of characters by inserting at least two space characters within the plurality of characters to demarcate the at least three character strings from one another, and determining, by the computing device, at least two suggested character strings based at least in part on a first character string, a second character string and a third character string of the sequence of at least three character strings. The operations further include outputting, for display at the presence-sensitive device and at a text-suggestion area of the GUI, the at least two suggested character strings, receiving a selection that indicates a selected character string of the at least two suggested character strings, and outputting, for display at the presence-sensitive device and at a text-entry area of the GUI, the selected character string.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
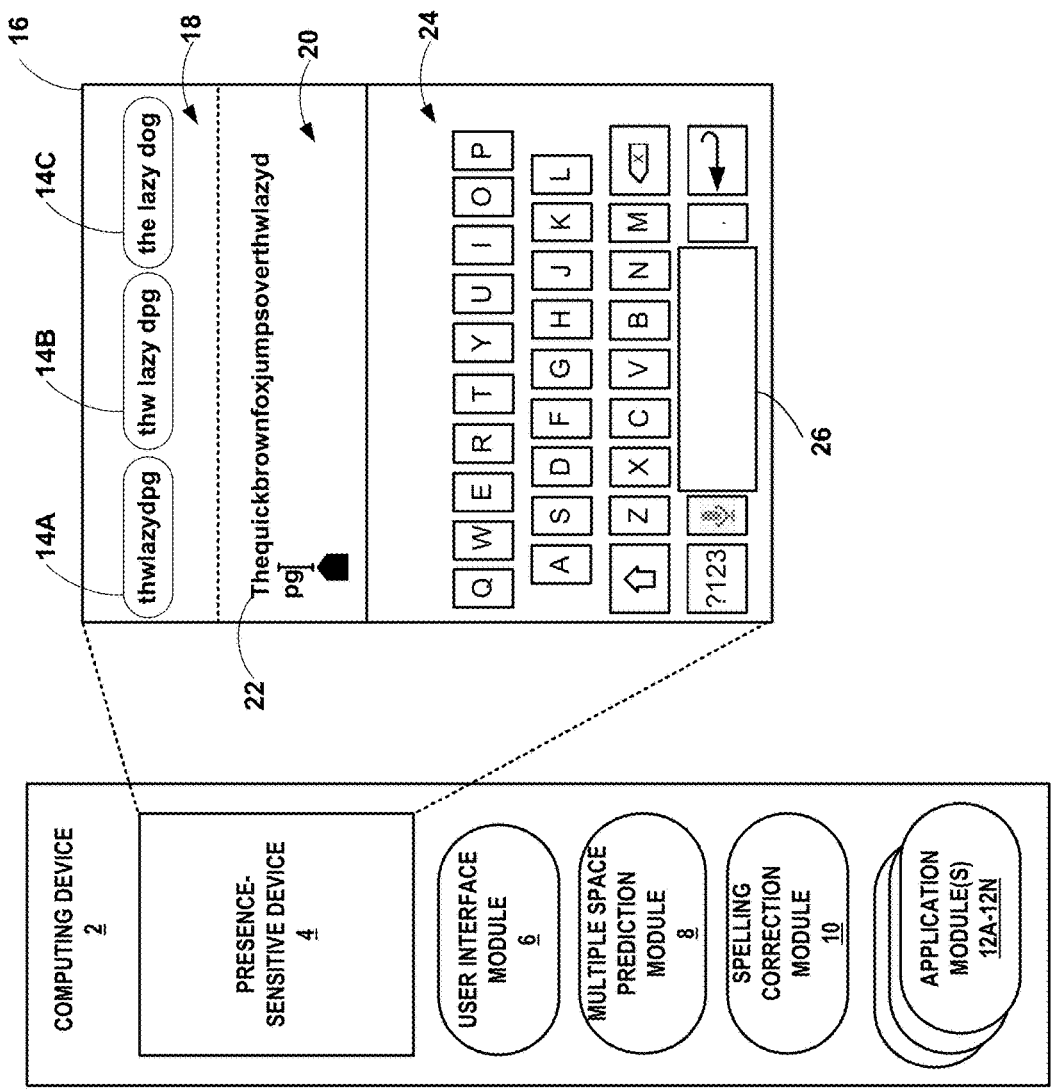
FIG. 1 is a conceptual diagram illustrating an example system comprising a computing device that may be configured or otherwise operable to implement one or more techniques of this disclosure.

With the increasing prevalence of mobile computing devices (such as smartphones, tablet computers, and others), which may incorporate or otherwise utilize presence-sensitive displays (e.g., touchscreens), users of such devices may utilize various text-input mechanisms. As one common example, a computing device equipped with a touchscreen may be configured to present virtual keyboards (e.g., keyboards providing a "QWERTY" layout) via the touchscreen. In turn, the computing device may receive text input from users via the touchscreen. For example, a user may input a particular character by tapping (e.g., with a finger or stylus) an area of the touchscreen at which the character's corresponding virtual key is displayed. In some instances, the user may perform a swipe gesture at the touchscreen to move from one virtual key to another, thereby inputting text at a faster pace.

In contrast to traditional text-input mechanisms, such as text-input through traditional keyboards, a virtual keyboard may limit a user's ability to utilize more than one finger to input text. For example, a user may commonly hold a smartphone with a non-dominant hand, and use a single finger (e.g., the index finger) of a dominant hand to input text through a virtual keyboard displayed at a touchscreen. In contrast, a user may be able to utilize up to all ten fingers while providing text input through a traditional keyboard, as may be coupled to a desktop or laptop computer. In turn, while using a traditional keyboard, a user may be able to devote the use of one or both thumbs to the use of the spacebar (as is the case with several common typing methods, such as so-called "touch typing"). In the case of single-finger typing methods common to touchscreen-based virtual keyboards, however, a user may expend significant time tapping a virtual spacebar when entering multi-word inputs using the virtual keyboard.

In general, techniques of the present disclosure are directed towards mitigating the time to enter multiple spaces when receiving input through a user interface device, such as a presence-sensitive screen. In some implementations, the techniques may enable a computing device to accept multi-character text input and automatically add space characters in order to demarcate various character strings, such as words, from one another. For example, a computing device implementing these techniques may receive a multi-character text input and modify the text input by inserting two or more space characters within the text, thereby demarcating three or more words in the text input. The computing device may, in some implementations, automatically modify one or more characters in the text input to perform spelling correction.

The techniques described herein may provide one or more potential advantages. As one example, a computing device implementing the techniques may enable a user to enter text at a faster rate via a touchscreen-based virtual keyboard. More specifically, by inserting multiple space characters into the text input, the computing device may potentially reduce constraints that interrupt a user's text input actions and that may require the user to input space characters at regular intervals. In some instances, the techniques may eliminate the need for a user to utilize a virtual spacebar, thereby enabling a user to continuously input text at a fast rate. Additionally, in implementations where the computing device performs spelling correction, the techniques may reduce constraints on a user that require unduly precise tapping/swiping, which may be difficult owing to the small size of virtual keys in comparison to the size of most users' fingertips.

FIG. 1 is a conceptual diagram illustrating an example system comprising computing device 2 that may be configured or otherwise operable to implement one or more techniques of this disclosure. Computing device 2 may include or be part of one or more of a variety of types of devices including mobile phones (such as "smartphones"), personal digital assistants (PDAs), tablet computers, convertible laptop/tablet computers, watches, and various other devices or mobile computing devices.

As shown in FIG. 1, computing device 2 may include presence-sensitive device 4, user interface (UI) module 6, multiple-space prediction module 8, spelling correction module 10, and one or more application modules 12A-12N. Presence-sensitive device 4 may include or be part of several types of input/output capable devices, such as a touchscreen. Examples of touchscreens known in the art include resistive touchscreens, capacitive touchscreens, optical touchscreens, and various others. In various examples, presence-sensitive device 4 may be configured or otherwise operable to receive user input via contact by a stylus or a user's finger. In these and other implementations, presence-sensitive device 4 may not require physical contact to receive input. Instead, in such implementations, presence-sensitive device 4 may recognize and receive user input based on a proximity of a stylus, finger, or other input device (e.g., using physical criteria such as capacitance, or using inductive, and/or optical detection at or near the presence sensitive display.). In this manner, presence-sensitive device 4 may enable computing device 2 to detect user input in a variety of ways.

In various implementations, UI module 6 may enable computing device 2 to output, for display at presence-sensitive device 4, graphical user interface (GUI) 16. As shown, GUI 16 may include various regions or areas, such as text-suggestion area 18, text-entry area 20, and virtual keyboard 24. In the example of FIG. 1, text-suggestion area 18 and text-entry area 20 are demarcated by a dashed-line border, to indicate that, in various implementations, GUI 16 may or may not include a visible border to demarcate text-suggestion area 18 from text-entry area 20.

UI module 6 may enable computing device 2 to receive input that indicates textual data (e.g., individual characters, character strings). As described, the input may be entered at presence-sensitive device 4. More specifically, UI module 6 may enable computing device 2 to detect user gestures, such as taps, swipes, and the like at various areas of presence-sensitive device 4. For example, UI module 6 may detect a gesture, such as a tap, in an area of presence-sensitive device 4 that is associated with virtual keyboard 24. Based on a general location of the detected tap gesture, UI module 6 may detect the indicated textual data. For example, if UI module 6 detects a tap gesture at an area of presence-sensitive device 4 that is associated with the 'A' key of virtual keyboard 24, UI module 6 may recognize an input of textual data corresponding to the character 'A.' Similarly, UI module 6 may detect a swipe gesture at presence-sensitive device 4 that corresponds to a movement between various characters represented within virtual keyboard 24. Based on characters indicated in the swipe gesture, as well as lexicon entries available to computing device 2, UI module 6 may recognize a character string (e.g., a word, numerical sequence) in the indicated textual data.

In some implementations, UI module 6 may output the received textual data at presence-sensitive device 4, e.g., at text-entry area 20 of GUI 16. In the example of FIG. 1, UI module 6 displays, at text-entry area 20, the following plurality or sequence of characters: "Thequickbrownfoxjumpsoverthwlazydpg." The described sequence of characters is referred to herein as character set 22. As described earlier, UI module 6 may recognize character set 22 based on gestures (e.g., a series of taps or a swipe) detected at an area of presence-sensitive device 4 that displays virtual keyboard 24. In the particular example of FIG. 1, UI module 6 may not detect a space character in character set 22 (e.g., indicated by a press of spacebar 26, or through a break between subsequent swipes).

In turn, multiple-space prediction module 8 may modify character set 22 by inserting at least two space characters into character set 22, thereby forming at least three character strings. For purposes of ease of illustration only, the functionalities of multiple-space prediction module 8 are described herein with respect to only a portion of character set 22, namely, the following subset of characters from character set 22: "thwlazydpg." In some implementations, multiple-space prediction module 8 may insert the space characters based on the detection of a recognized character string (e.g., from a lexicon accessible to computing device 2). For example, multiple-space prediction module 8 may recognize the character string "lazy" by using a lexicon, such as a dictionary, past user inputs, and others. Responsive to detecting the character string "lazy," multiple-space prediction module 8 may insert at least one space character on either side of the character string "lazy." By inserting the two space characters in this example, multiple-space prediction module 8 may form three distinct character strings, namely, "thw," "lazy," and "dpg." In instances where multiple-space prediction module 8 modifies the entirety of character set 22, multiple-space prediction module 8 may insert more than two space characters, forming more than three character strings. At various instances herein, certain functionalities of multiple-space prediction module 8 may be referred to as "word segmentation prediction." In this manner, multiple-space prediction module 8 may enable a user to enter a character set without entering a space character (e.g., through tapping of spacebar 26, lifting a finger/stylus between swipes, etc.) and enter multiple space characters in the character set based on various criteria and/or string detection techniques.

Spelling correction module 10 may, in various implementations, be configured or otherwise operable to generate alternate spellings of character strings included in character set 22. For example, spelling correction module 10 may implement one or more spelling-correction techniques known in the art to generate alternate spellings of the character strings. In some instances, spelling correction module 10 may implement the spelling-correction techniques on character strings that are parsed by multiple-space prediction module 8 from character set 22. In the example described above, multiple-space prediction module 8 extracts character strings "thw," "lazy," and "dpg" from character set 22. In this example, spelling correction module 10 may implement the spelling-correction techniques to correct the extracted character strings reading "thw" and "dpg" to read "the" and "dog" respectively. Spelling correction module 10 may implement various methodologies related to spelling correction, such as a spatial model that utilizes the proximities between various keys within virtual keyboard 24 displayed at presence-sensitive device 4.

UI module 6 may output, for display at presence-sensitive device 4, various text suggestions generated by one or both of multiple-space prediction module 8 and spelling correction module 10. In the example illustrated in FIG. 1, multiple-space prediction module 8 and spelling correction module 10 may generate suggested text entries in the form of text suggestions 14A-14C ("text suggestions 14"). For purposes of this disclosure, the expressions "text suggestion" and "suggested character string" may be used interchangeably. In particular, text suggestion 14A may include a so-called "literal string" of characters extracted from character set 22. More specifically, the literal string of text suggestion 14A may include a sequence of characters extracted from character set 22, with no further modification implemented by either multiple-space prediction module 8 or spelling correction module 10. As illustrated in FIG. 1, the literal string of text suggestion 14A reads "thwlazydpg," which is identical to the last ten characters of character set 22.

In contrast to the literal string of text suggestion 14A, text suggestion 14B includes two space characters. More specifically, multiple-space prediction module 8 may insert the space characters based on various criteria. As one example, multiple-space prediction module 8 may match the character string "lazy" to a lexicon entry accessible to computing device 2, and insert the space characters on either side of the recognized character string. In this and other examples, multiple-space prediction module 8 may utilize various language prediction techniques, such as the n-gram language that is known in the art, to demarcate the different character strings included in the last ten characters of character set 22. By inserting the two space characters at the described locations, multiple-space prediction module 8 may generate text suggestion 14B, which reads "thw lazy dpg." As shown, multiple-space prediction module 8 implements the techniques of this disclosure to insert the two space characters to demarcate three character strings included in character set 22, thus forming text suggestion 14B.

Additionally, UI module 6 also outputs, for display at text-suggestion area 18 of UI 16, text suggestion 14C. As shown, text suggestion 14C also includes two space characters, namely, one space character positioned on either side of the character string "lazy." In the case of text suggestion 14C, spelling correction module 10 may implement one or more spelling-correction techniques to modify one or more characters strings extracted from character set 22. As described, in the specific example of text suggestion 14C, spelling correction module 10 may modify the character strings reading "thw" and "dpg" to read "the" and "dog" respectively. As a result, text suggestion 14C may represent a spell-corrected version of text suggestion 14B, which in turn may represent a space-corrected version of text suggestion 14A. In other implementations, UI module 6 may refrain from outputting, for display at presence-sensitive device 4, one or both of the literal string and the space-corrected version of the literal string. In such implementations, UI module 6 may conserve display area within GUI 16 to display space- and spell-corrected text suggestions, similar to text suggestion 14C. In this manner, computing device 2 may implement the techniques of this disclosure to output various types of space-corrected and/or spell-corrected text suggestions generated from character set 22. Other examples of spelling correction methods that spelling correction module 10 may implement using techniques of this disclosure include transpositions (e.g., correcting "istihs" to "is this" by swapping adjacent characters), correcting erroneous deletions (e.g., correcting "isths" to "is this" by inserting missing character), correcting superfluous/extraneous characters (e.g., correcting "isthiis" to "is this" by deleting a superfluous letter), and substitutions (e.g., correcting "isthjs" to "is this" by replacing an incorrect letter).

While both of text suggestions 14B and 14C are illustrated as including two inserted space characters for purposes of illustration, it will be appreciated that computing device 2 and/or components thereof may implement techniques of this disclosure to insert varying numbers of space characters in forming different text suggestions. For example, a first text suggestion may include two inserted space characters, while a second text suggestion may include three inserted space characters. Additionally, computing device 2 and/or components thereof may rank the text suggestions based on various criteria, such as past selections by a user, or presence of the preceding characters (e.g., a "prefix") of the space character in a lexicon accessible to computing device 2.

Also, while described herein largely with respect to insertion of multiple space characters, computing device 2 and/or components thereof may implement the techniques of this disclosure to insert a single space character in a received character set (e.g., thereby forming two character strings demarcated by the inserted space character). In this manner, computing device 2 and/or components thereof may implement the techniques of this disclosure to demarcate two character strings, e.g., in scenarios where one or both of the demarcated character strings is relatively lengthy, thus taking up display space within text-entry area 20 and/or text-suggestion area 18 of GUI 16.

Additionally, UI module 6 may receive, via presence-sensitive device 4, a selection that indicates a selected text suggestion of text suggestions 14. In various examples, UI module 6 may receive the selection as an input (such as a tap gesture) provided by a user at a particular portion of UI 16 as displayed at presence-sensitive device 4. For instance, a user may perform a tap gesture using a finger or stylus within text-suggestion area 18. More specifically, the tap gesture may cover at least a portion of text-suggestion area 18 that is associated with text suggestion 14C. Responsive to receiving the selection, UI module 6 may output, for display at presence-sensitive device 4, and at text-entry area 20 of UI 16, the text of text suggestion 14C. For example, UI module 6 may modify text-entry area 20 such that at least a portion of character set 22 is replaced with the text (namely, "the lazy dog") presented in text suggestion 14C. In this manner, computing device 2 and components thereof may implement the techniques of this disclosure to make preferred text suggestions visually distinct to a user of computing device 2.

Figure 2:
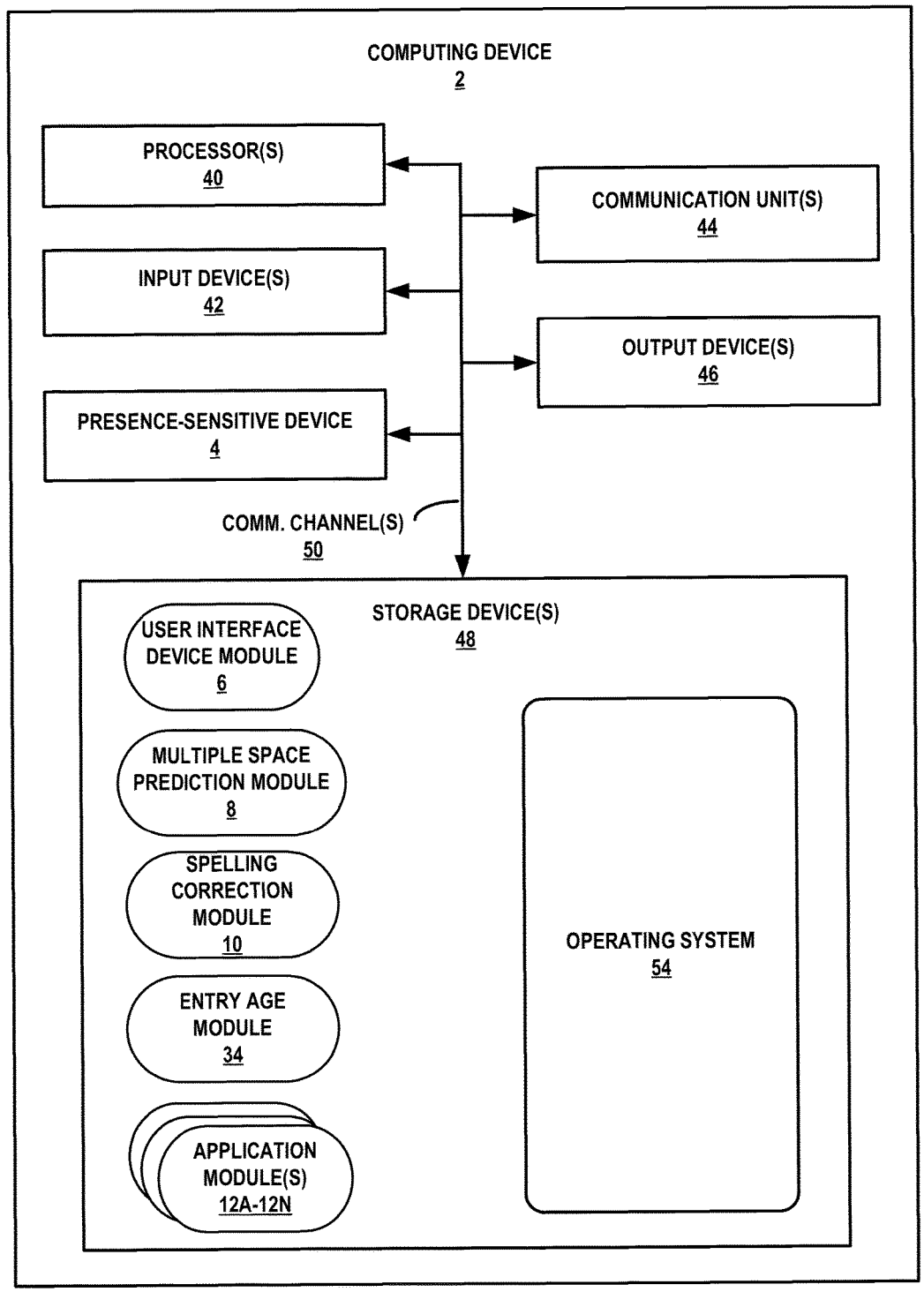
FIG. 2 is a block diagram illustrating details of an example computing device that may be configured or otherwise operable to perform one or more techniques of this disclosure.

FIG. 2 is a block diagram illustrating details of an example computing device 2 that may be configured or otherwise operable to perform one or more techniques of this disclosure. Computing device 2 shown in FIG. 2 is one example implementation of computing device 2 illustrated in and described with respect to FIG. 1. Several elements of FIG. 2 are numbered similarly to corresponding elements of FIG. 1. Commonly numbered elements of FIGS. 1 & 2 may operate similarly. For ease of discussion, only those elements with different element numbers from FIG. 1 are described with respect to FIG. 2. It will be appreciated that other implementations of computing device 2 shown in FIG. 1 may perform one or more techniques of this disclosure, and that different implementations may be used in various instances.

As shown in the example of FIG. 2, computing device 2 may include one or more processors 40, one or more input devices 42, one or more communication units 44, one or more output devices 46, one or more storage devices 48, and presence-sensitive device 4. Computing device 2, in one implementation, further includes application modules 12 and operating system 54 that are executable by computing device 2. Each of components 4, 40, 42, 44, 46, and 48 may be interconnected (physically, communicatively, and/or operatively) for inter-component communications. In some examples, communication channels 50 may include a system bus, network connection, inter-process communication data structure, or any other channel for communicating data. As one example in FIG. 2, components 4, 40, 42, 44, 46, and 48 may be coupled by one or more communication channels 50. Application modules 12 and operating system 54 may also communicate information with one another as well as with other components in computing device 2.

Processors 40, in one example, are configured to implement functionality and/or process instructions for execution within computing device 2. For example, processors 40 may be capable of processing instructions stored in storage devices 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage devices 48, in some examples, are described as a computer-readable storage medium. In some examples, storage devices 48 comprise temporary memory, meaning that a primary purpose of storage devices 48 is not long-term storage. Storage devices 48, in some examples, are described as a volatile memory, meaning that storage devices 48 do not maintain stored contents when the computer is turned off. Examples of volatile memories include random access memories (RAM), dynamic random access memories (DRAM), static random access memories (SRAM), and other forms of volatile memories known in the art. In some examples, storage devices 48 are used to store program instructions for execution by processors 40. Storage devices 48, in one example, are used by software or applications running on computing device 2 (e.g., applications 48) to temporarily store information during program execution.

Storage devices 48, in some examples, also include one or more computer-readable storage media. Examples of such computer-readable storage media may include a non-transitory computer-readable storage medium, and various computer-readable storage devices. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth®, 3G, 4G, and WiFi® radios computing devices as well as Universal Serial Bus (USB). In some examples, computing device 2 utilizes communication unit 44 to wirelessly communicate with an external device.

Computing device 2, in one example, also includes one or more input devices 42. Input device 42, in some examples, is configured to receive input from a user through tactile, audio, or video feedback. Examples of input device 42 include a presence-sensitive display (such as a touchscreen), a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display (e.g., a touchscreen), a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user. In some examples, presence-sensitive device 4 may include functionality of input device 42 and/or output device 46. In the example of FIG. 2, presence-sensitive device 4 may include or be part of a touch-sensitive screen, a touchscreen, or the like.

Computing device 2 may include operating system 54. Operating system 54, in some examples, controls the operation of components of computing device 2. For example, operating system 54, in one example, facilitates the communication of application modules 12 with processors 40, communication unit 44, storage devices 48, input device 42, and output device 46. As shown in FIG. 2, storage devices 48 may include UI module 6, multiple-space prediction module 8, spelling correction module 10, entry age module 34, and application modules 12, as described in FIG. 1. Application modules 12 may each include program instructions and/or data that are executable by computing device 2. As one example, UI module 6 may include instructions that cause computing device 2 to perform one or more of the operations and actions described in the present disclosure.

As described with respect to FIG. 1, multiple-space prediction module 8 may perform various operations, such as the insertion of two or more space characters, on text inputs received via input device 42 and/or presence-sensitive device 4. In a specific example, multiple-space prediction module 8 may insert two space characters at various points within a received text input, thus forming a sequence of three distinct character strings. More specifically, the two inserted space characters may demarcate the three character strings from one another. Based on the generated sequence of three character strings, multiple-space prediction module 8 (and/or other components of computing device 2) may generate and cause UI module 6 to output (e.g., via display at presence-sensitive device 4) one or more text suggestions.

As one example, multiple-space prediction module 8 may generate a text suggestion that represents the sequence of three character strings separated by the respective inserted space characters. Such a text suggestion may be referred to herein as a "space-corrected" text suggestion. As another example, multiple-space prediction module 8 may, in collaboration with spelling correction module 10, generate a text suggestion that is referred to herein as a "space- and spell-corrected" text suggestion. In this example, spelling correction module 10 may identify one or more erroneous characters included in the original text input. Responsive to identifying the erroneous character(s), spelling correction module 10 may delete the erroneous character(s). For instance, spelling correction module 10 may detect that the text input includes multiple consecutive instances of the same character. Applying one or more spelling-correction techniques (e.g., by comparing a character string of the text input to an entry in a lexicon accessible to computing device 2), spelling correction module 10 may detect that redundant instances of the character are superfluous. By deleting the superfluous character(s), spelling correction module 10 may remove erroneous instances of multiple (e.g., double, triple) consecutive characters, thereby generating a more correct representation of the original text input.

In other examples, spelling correction module 10 may replace the deleted erroneous character(s) with corresponding alternate character(s). In such examples, spelling correction module 10 may utilize various criteria, such as, for example, proximity between keys within a virtual keyboard that UI module 6 outputs for display at presence-sensitive device 4, in determining the appropriate alternate character for a corresponding erroneous character. For instance, spelling correction module 10 may detect a misspelling (e.g., via lexicon comparison) of a character string within the text input. Based on the detected misspelling, spelling correction module 10 may identify one or more possible erroneous characters in the string, and determine the alternate characters based on proximity of the alternate characters to the erroneous characters within the virtual keyboard.

Additionally, spelling correction module 10 may filter the pool of possible alternate characters, e.g., based on lexicon comparison. For example, if replacing an erroneous character with a particular alternate character results in a failed lexicon match, spelling correction module 10 may eliminate that particular alternate character from consideration. As one illustrative example, spelling correction module 10 may identify the 'w' character as erroneous in the character string "thw." In turn, spelling correction module 10 may generate a pool of alternate characters including 'e' and 'q' based on the proximity of 'e' and 'q' keys to a 'w' key on a QWERTY keyboard layout. Based on the character string "thq" not matching any lexicon entries, spelling correction module 10 may eliminate 'q' as a possible alternate character. Conversely, based on the character string "the" matching a lexicon entry, spelling correction module 10 may use 'e' as an alternate character, and generate the character string "the" as a text suggestion.

It will be appreciated that computing device 2 may implement the functionalities of multiple-space prediction module 8 and spelling correction module 10 in any order. In some scenarios, multiple-space prediction module 8 may modify a text input through insertion of multiple space characters before spelling correction module 10 detects and deletes one or more erroneous characters in the text input. In one such example, spelling correction module 10 may implement various spelling-correction techniques on the individual character strings demarcated by multiple-space prediction module 8. In another such example, spelling correction module 10 may implement, in addition to spelling-correction, various word-prediction techniques using language models known in the art. For instance, if spelling correction module 10 identifies multiple possible spelling suggestions for a string, spelling correction module 10 may select and/or prioritize the spelling suggestions using a language model. The language model may use various criteria, such as context provided by character strings that precede and/or follow the spell-corrected character string in the text input.

In other scenarios, spelling correction module 10 may implement one or more spelling-correction techniques on portions of the text input prior to multiple-space prediction module 8 modifying the text input. In some such examples, spelling correction module 10 may be configured or otherwise operable to detect potentially distinct character strings (e.g., through near-matches with lexicon entries) in the text input, and implement the spelling-correction techniques on the unmodified text input. In these and other examples, spelling correction module 10 may detect potentially erroneous characters in the unmodified text input based on one or more criteria (e.g., detection of redundant consecutive characters that may be erroneous).

In still other scenarios, computing device 2 may concurrently implement functionalities attributed to both multiple-space prediction module 8 and spelling correction module 10. For example, multiple-space prediction module 8 and spelling correction module 10 may concurrently perform space-insertion and spelling-correction functionalities (either independently of one another, or interdependently, as the case may be). In this manner, computing device 2 may implement techniques of this disclosure in a variety of orders/sequences to generate and output text suggestions to a user.

As described with respect to FIG. 1 (e.g., the literal string of text suggestion 14A), multiple-space prediction module 8 may, in some instances, cause UI module 6 to output, for display at presence-sensitive device 4, a literal string (e.g., extracted from the received text input) that does not include any space characters. In such instances, multiple-space prediction module 8 may form the literal string using the character string(s) identified in the received text input. For example, multiple-space prediction module 8 may concatenate two or more character strings identified from the received text input such that the concatenated result does not include any space characters. As described, multiple-space prediction module 8 may generate a text suggestion (or suggested character string) that is based on the literal string formed through the concatenation process.

Conversely, multiple-space prediction module 8 may generate a different text suggestion by inserting at least one space character between different character strings identified in the text input. For instance, in the concatenation-based methodology described above, multiple-space prediction module 8 may insert a space character between the two concatenated character strings, thereby forming a second text suggestion (e.g., the space-corrected string of text suggestion 14B in FIG. 1). In this manner, computing device 2 may implement the techniques of this disclosure to use character string concatenation and space character-insertion to generate multiple, different text suggestions.

As shown in the specific example of FIG. 2, computing device 2 may also include entry age module 34. In various examples, entry age module 34 may be configured or otherwise operable to determine an entry age of a received text input and/or separate entry ages associated with particular character strings or characters identified within the text input. As one example, entry age module 34 may determine an entry age of the entire text input, based on a detected time when entry of the input began and/or a detected time when entry of the input ended. In other examples, entry age module 34 may determine the entry age with respect to other received text inputs. In one such example, entry age module 34 may determine the entry age as a function of a number of characters (and/or strings) that have been received subsequent to receiving the original text input. In this manner, entry age module 34 may determine entry age based on different types of criteria, such as temporal criteria indicated by passage of time or amounts of subsequently entered text.

As described, in some scenarios, entry age module 34 may determine the entry age of particular character strings (e.g., as identified by multiple-space prediction module 8) included in the received text input. In specific examples, entry age module 34 may discern one or both of the time when entry of the string began and the time when entry of the string ended (e.g., through use of timestamps associated with receipt of the first and final character of the string, respectively). Based on the discerned time (e.g., the timestamp associated with receipt of the final character of the character string), entry age module 34 may determine an elapsed time measured from the entry time of the final character to a current time (e.g., accessible through a timer or clock included in or coupled to computing device 2). For example, if the elapsed time corresponds to a span of twenty seconds, entry age module 34 may determine that the character is, as one example, "twenty seconds old" for text entry purposes.

In some implementations, entry age module 34 may determine the entry age of the character string based on a number of subsequent characters of the text input that are positioned to one side of the character string. For example, if entry age module 34 determines that fifteen characters are positioned to the right of the character string (e.g., to the right of the final character of the character string) in the text input, entry age module 34 may determine that the character string is, as one example, "fifteen characters old" for text entry purposes. As another example, entry age module 34 may determine the entry age of the character string based on a number of subsequent characters that are positioned below the character string (e.g., including characters that represent carriage returns).

It will be appreciated that, in some instances where entry age module 34 detects subsequent characters positioned to the right of the character string, the subsequent characters may be displayed at presence-sensitive device 4 such that at least a portion of the subsequent characters appears below the character string. Reasons for this appearance may include size constraints associated with presence-sensitive device 4, a layout of a user interface provided by UI module 6 (e.g., based on a nature of an application currently executing on computing device 2), and others.

Based on the determined entry age of a character string, entry age module 34 may commit the character string. In specific examples, entry age module 34 may commit the character string at least in part by causing UI module 6 to output the character string for display in a text-entry area of a UI. In some such examples, entry age module 34 may cause UI module 6 to refrain from outputting the character string in a text-suggestion area of the UI. In various examples, entry age module 34 may commit a string that has been modified (e.g., spell corrected) by spelling correction module 10. For instance, entry age module 34 and/or spelling correction module 10 may commit a highest-ranked spell-corrected character string of available characters that meet or exceed the threshold entry age. Various aspects of committing character strings and display via of text-entry and text-suggestion areas of a UI are discussed in more detail with respect to FIGS. 3A & 3B below.

As described with respect to FIG. 1, UI module 6 may, in some scenarios, display multiple text suggestions in a text-suggestion area of a UI provided at presence-sensitive device 4. In some implementations, one or more components of computing device 2 (e.g., multiple-space prediction module 8) may designate a particular one of the text suggestions as a preferred text suggestion. Additionally, computing device 2 may apply one or more criteria in selecting the preferred text suggestion from the multiple text suggestions. For example, computing device 2 may select the preferred text based on heuristic data available to computing device 2 (e.g., via local storage on storage devices 48, from a remote device accessible using communication unit(s) 44, and others). The heuristic data may include data associated with previous selections of particular text suggestions, previous typing errors associated with a particular user account that is currently active on computing device 2, and the like. In some instances, computing device 2 may display the preferred text suggestion in such a way that the preferred text suggestion is visually differentiated from the remaining text suggestions (e.g., in a bold font, with highlighting, and other visual distinctions known in the art).

For example, if computing device 2 and/or components thereof determine that a particular user account is associated with frequent selection of a particular text suggestion, computing device 2 may designate that text suggestion as a preferred text suggestion. In cases where multiple text suggestions have been designated with preferred status, computing device 2 may prioritize the various preferred text suggestions (e.g., using the heuristic data available to computing device 2). In this manner, computing device 2 may select and optionally prioritize various preferred text suggestions using heuristic data associated with such criteria as previous selections of particular text suggestions.

Figure 3:
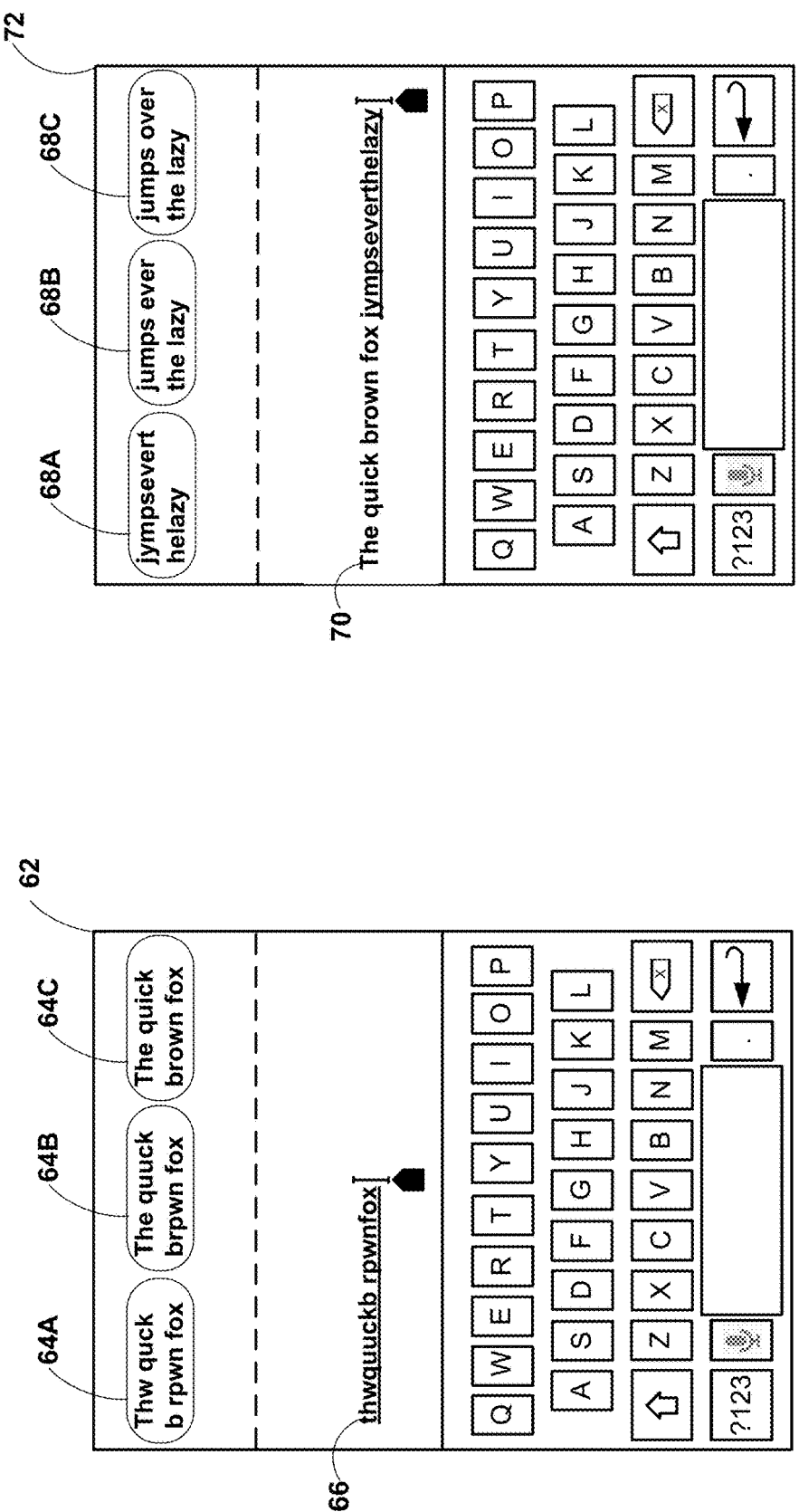
FIGS. 3A & 3B are conceptual diagrams illustrating example user interfaces (UIs) that show the implementation of one or more multiple space prediction techniques of this disclosure.

FIGS. 3A & 3B are conceptual diagrams illustrating example user interfaces (UIs) 62 and 72 that show the implementation of one or more multiple space prediction techniques of this disclosure. Text input 66 may represent an unmodified input indicated by a user through the virtual keyboard (not numbered separately for purposes of clarity only). In the example of FIG. 3A, text suggestions 64A-64C ("text suggestions 64") may include various instances of space-correction and spelling-correction. For example, text 64A includes a character string that results from inserting two space characters in text input 66 (namely, between the first 'w' character and the 'q' as well as between the 'n' and 'f' characters), indicating space correction.

Additionally, the 't' character at the beginning of text input 66 is capitalized to read 'T' (indicating spell-correction). In various scenarios, capitalization of an initial character may also be referred to as grammar-correction, and other similarly descriptive terms. Additionally, text suggestion 64A does not include a second consecutive 'u.' character from text input 66. As described, a computing device, such as computing device 2 of FIGS. 1 & 2 may delete potentially erroneous characters, such as characters that are entered due to errant double taps of a virtual key.

Text suggestion 64B includes the space- and spell-corrected text of text suggestion 64A, but with additional space correction. More specifically, text suggestion 64B does not include the space character included in text input 66 positioned between the 'b' and 'r' characters. In this instance, a device, such as computing device 2 of FIGS. 1 & 2, may implement space-correction techniques that enable deletion of potentially errant entries of a space character (e.g., as may be caused by stray contact of a finger with a presence-sensitive device at the spacebar of the virtual keyboard).

In the example illustrated in FIG. 3A, text suggestion 64C includes a space- and spell-corrected modification of text input 66. As shown, text suggestion 64C includes the capitalization of text suggestion 64A, the inserted space characters of text suggestions 64A & 64B, and the space character deletion of text suggestion 64B. In addition, text suggestion 64C includes spelling corrections associated with deletion and, optionally, replacement of potentially erroneous characters included in text input 66. The space- and spell-corrected text of text suggestion 64C results in the following character sequence: "The quick brown fox." In some instances, text suggestion 64C may be a preferred text suggestion, based on criteria such as all four included character strings matching lexicon entries accessible to a computing device that outputs UI 62.

FIG. 3B illustrates updated UI 72, which in some instances, may represent a version of UI 62 that is modified due to additional text input by a user as well as committing of a text suggestion using techniques of this disclosure. As shown, updated UI 72 includes continued text input 70. More specifically, continued text input 70 includes text corresponding to preferred text suggestion 64C of FIG. 3B, followed by additional text (demarcated by underlining). The additional text includes sixteen characters (as shown in the literal string of text suggestion 68A), or 4 character strings, as shown in the space-corrected text of text suggestions 68B & 68C. Based on the length of the additional text, the computing device implementing the techniques of this disclosure may determine that (original) text entry 66 is sixteen characters old, in terms of entry age. Based on the determination of the entry age of text entry 66, the computing device may commit preferred text suggestion 64C, by outputting the text of preferred text suggestion 64C in the text-entry area of updated UI 72. In turn, the computing device may output text suggestions 68 that are generated based on the additional text of continued text input 70. In this manner, a computing device may implement the techniques of this disclosure to commit preferred text suggestions as the computing device receives additional text input via a user interface. By repeating (e.g., recursively executing) the commitment techniques described herein, a computing device may implement the techniques over text inputs of varying lengths, some of which may be arbitrary and relatively long.

While illustrated with respect to committing a set of four words in the example of FIG. 3B, it will be appreciated that a computing device implementing the techniques of this disclosure may, in various scenarios, commit varying numbers of words/character strings at a time, such as single-, double-, or triple-word sets. Alternatively, the techniques may enable deactivation of character string committing, thereby preventing committing of character strings by the computing device, regardless of the entry age of any character string included in text entry 66.

Figure 4:
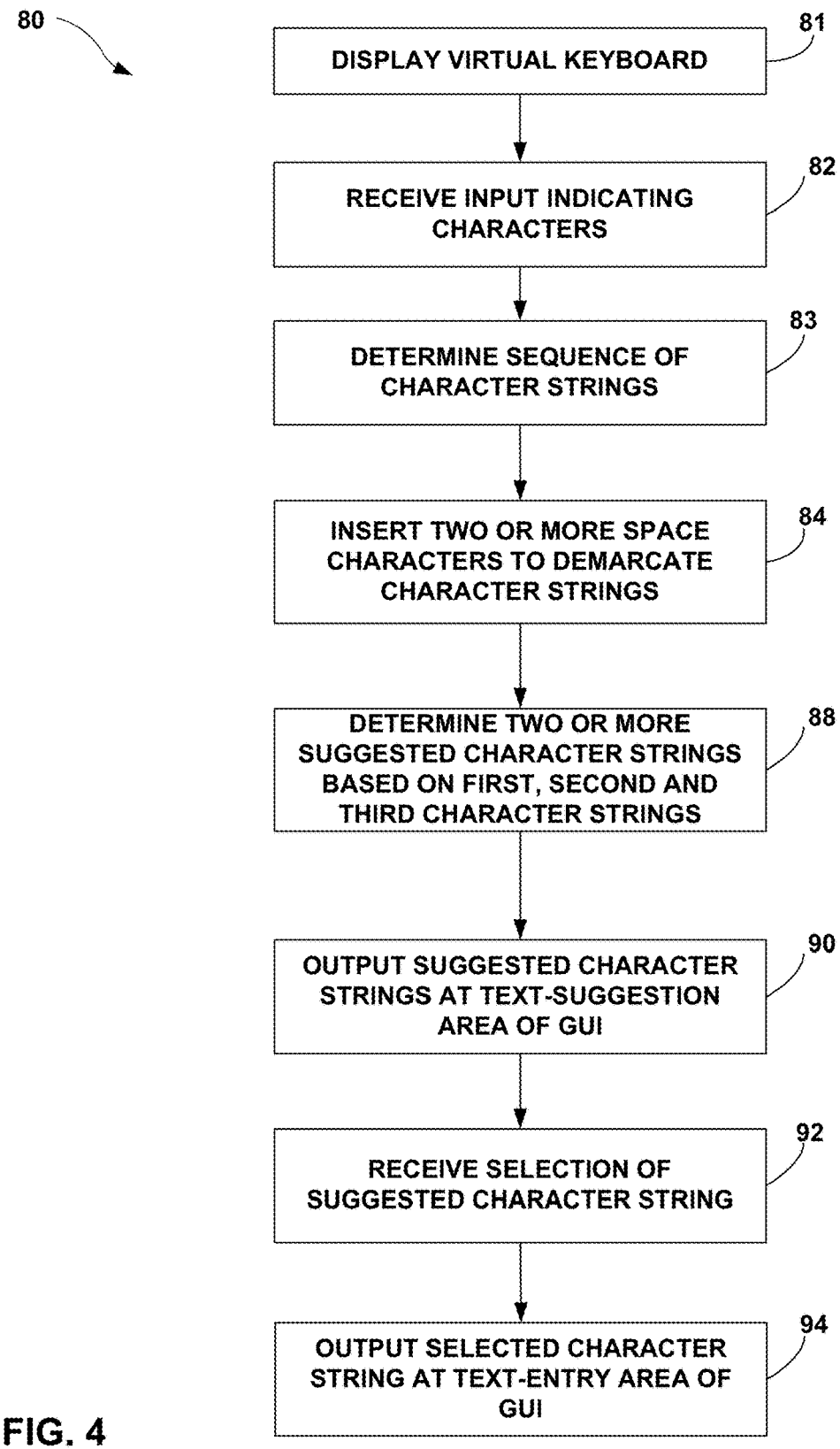
FIG. 4 is a flowchart illustrating an example process by which a computing device may implement one or more techniques of this disclosure.

FIG. 4 is a flowchart illustrating an example process 80 by which a computing device may implement one or more techniques of this disclosure. Although process 80 may be performed by a variety of devices, for ease of discussion purposes only, process 80 is described herein with respect to computing device 2 of FIG. 1. Process 80 may begin when computing device 2 outputs, for display at presence-sensitive device 4 and in a keyboard area of GUI 16, virtual keyboard 24 that includes various keys, such as spacebar 26 (81). Additionally, computing device 2 may receive, an indication of an input entered at presense-sensitive device 4, the input indicating a plurality of characters (82).

Multiple-space prediction module 8 may determine a sequence of at least three character strings included in the plurality of characters, such that the sequence does not include any space characters (83). Additionally, multiple-space prediction module 8 may modify the plurality of characters by inserting at least two space characters within the plurality of characters to demarcate the three character strings from one another (84). Multiple-space prediction module 8 may determine at least two suggested character strings based at least in part on a first character string, a second character string, and a third character string of the sequence of three character strings (88).

UI module 6 may output, for display at presence-sensitive device 4 and at text-suggestion area 18 of GUI 16, the two or more suggested character strings (90). Additionally, UI module 6 may receive a selection that indicates a selected character string of the two or more suggested character stings (92). As described, UI module 6 may receive the input as a gesture, such as a tap, detected at presence-sensitive device 4. UI module 6 may output, for display at presence-sensitive device 4 at and at text-entry area 20 of GUI 16, the selected character string (94).

In some implementations, UI module 6 may determine whether computing device 2 has received, within a predetermined time period, the selection that indicates the selected character string. Responsive to determining that computing device 2 has not received the selection within the predetermined time period, UI module 6 may output, for display at presence-sensitive device 4, the preferred suggested character string (e.g., as determined based on heuristic data, etc. as described with respect to FIG. 2).

In some implementations, computing device 2 may determine that a last (or final) character of the first character string represents a terminal character, the determination indicating that the first character string is included in a lexicon accessible to computing device 2. Additionally, computing device 2 may determine that a first character of the second character string indicates a search path with respect to the first character string when concatenated with the first character string, the determination indicating that the concatenation of the first character string with the first character of the second character string forms at least a portion of an entry in a lexicon accessible to the computing device. In such implementations, a first suggested character string of the two or more suggested character strings may include the first character string followed by a space character, and a second suggested character string of the two or more suggested character strings may include the first character string followed by at least the first character of the second character string.

In various implementations, UI module 6 may output, for display at presence-sensitive device 4 and at text-entry area 20 of GUI 16, character set 22 generated based at least in part on the plurality of characters. Additionally, in some such implementations, UI module 6 may remove, from display at presence-sensitive device 4 and at text-entry area 20 of GUI 16, character set 22 in response to receiving the selection of the selected character string.

In some such implementations, UI module 6 may receive, via GUI 16, an indication of a second input entered at presence-sensitive device 4, the second input indicating a second plurality of characters. Multiple-space prediction module 8 may determine a second sequence of at least two character strings included in the second plurality of characters, such that the second sequence does not include any space characters. Multiple-space prediction module may modify the second plurality of characters by inserting at least one space character within the second plurality of characters to demarcate the at least two character strings from one another. Additionally, UI module 6 may output, for display at presence-sensitive device 4, the selected character string and a second character set generated based at least in part on the second plurality of characters, such that the second character set is displayed to one side of the selected character string at text-entry area 20 of GUI 16.

Figure 5:
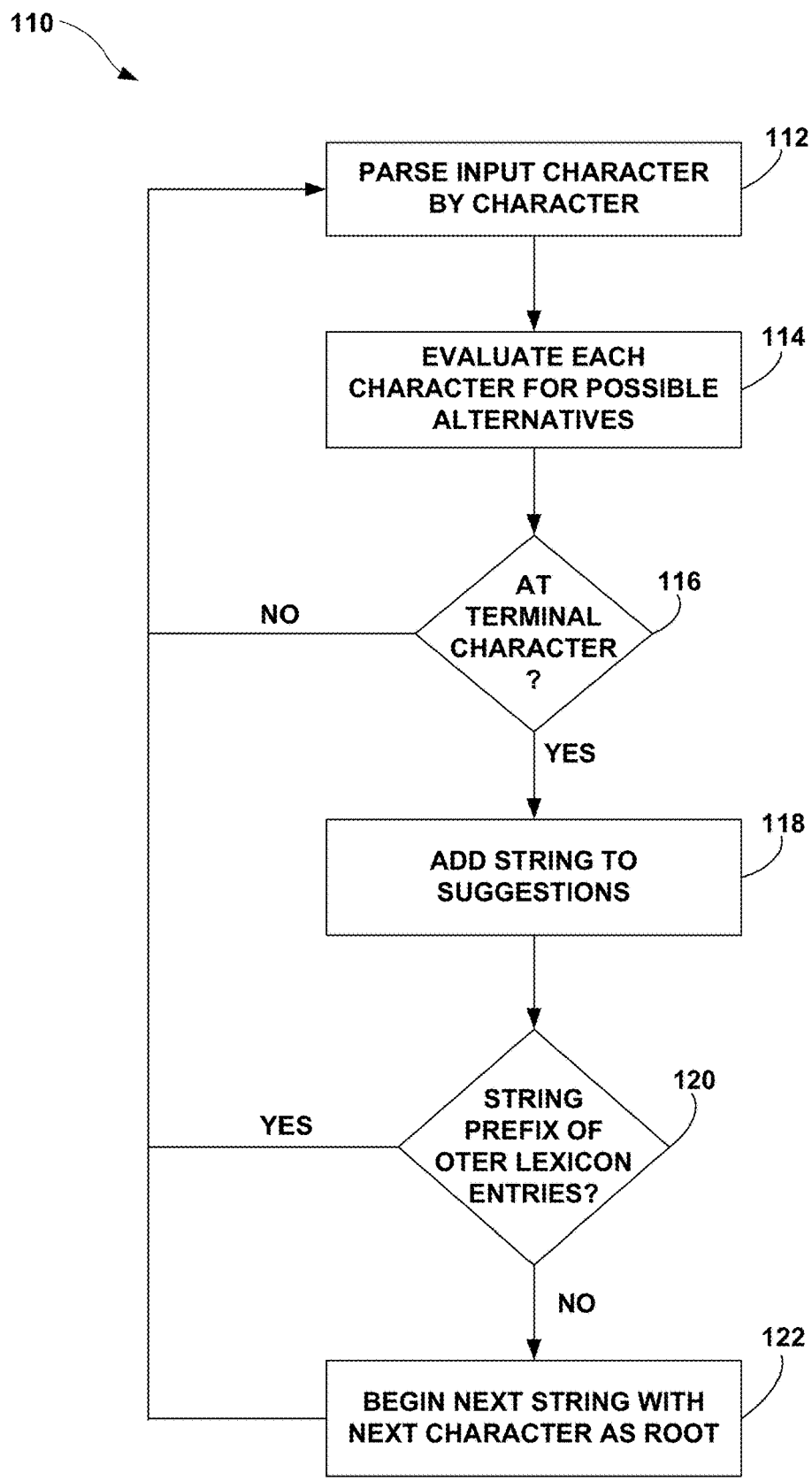
FIG. 5 is a flowchart illustrating an example process by which a computing device may identify and extract character strings (e.g., dictionary words) from a text input, such as a set or plurality of characters.

FIG. 5 is a flowchart illustrating an example process 110 by which a computing device may identify and extract character strings (e.g., dictionary words) from a text input, such as a set or plurality of characters. It will be appreciated that process 110 may be performed by any of a variety of devices. However, as with other example processes described herein, process 110 is described with respect to computing device 2 of FIG. 1, for purposes of clarity only.

Process 110 may begin when multiple-space prediction module 8 parses a text input on a character-by-character basis (112). Additionally, spelling correction module 10 may evaluate each character for possible alternatives (114). For instance, spelling correction module 10 may flag potentially erroneous characters and identifying possible alternate characters. In evaluating each character for possible alternatives, spelling correction module 10 may employ various factors, such as the position of a respective character within a string (e.g., first intra-string character, second intra-string character, and so on). Multiple-space prediction module 8 may determine whether the parsing process is at a terminal character (decision block 116). More specifically, a terminal character may, in examples, indicate a character that represents the end of a lexicon entry. If multiple-space prediction module 8 determines that a current character is not a terminal character, multiple-space prediction module 8 may continue to parse characters of the text input (e.g., returning to 112). Conversely, if multiple-space prediction module 8 determines that the current character represents a terminal character (or "terminal node"), multiple-space prediction module 8 may add the character string ending at the terminal character to a list of text suggestions (118).

Additionally, multiple-space prediction module 8 may determine whether the character string ending at the terminal node is a prefix other lexicon entries (decision block 120). More specifically, multiple-space prediction module 8 may determine if the character string forms a portion of another lexicon entry, such that the lexicon entry includes other characters subsequent to the identified character string. The subsequent characters may be referred to herein as a "suffix" of the string. As examples in a lexicon that tracks an English dictionary, the 't' character may represent a terminal character with respect to the character string 'present.' Additionally, the character string 'present' may be included in a lexicon entry 'presentation.' In this instance, multiple-space prediction module 8 may add the string 'present' to a list of text suggestions, and determine that the string is included in the lexicon entry 'presentation,' among potentially other entries as well. Based on this determination, multiple-space prediction module 8 may identify one or more additional search paths with respect to character strings including the string 'present.'

If the string is included in at least one other lexicon entry (e.g., multiple-space prediction module 8 identifies an additional search path based on the string), multiple-space prediction module 8 may continue to parse additional characters of the text input (e.g., returning to 112). On the other hand, if multiple-space prediction module 8 determines that the string is not included in any other lexicon entries, multiple-space prediction module 8 may begin a next character string with the next character of the text input as the root of the next character string. For instance, by beginning the next character string (e.g., a next word), multiple-space prediction module 8 may indicate that no additional search paths exist with respect to the already-identified character string. Upon beginning the next character string, multiple-space prediction module 8 may continue parsing subsequent characters of the text input (e.g., returning to 112).

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium or computer-readable storage device, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. Additional examples of computer readable medium include computer-readable storage devices, computer-readable memory, and tangible computer-readable medium. In some examples, an article of manufacture may comprise one or more computer-readable storage media.

In some examples, the techniques may be implemented by a control unit. For purposes of this disclosure, a control unit may, in various examples, comprise any combination of one or more processors, one or more field programmable gate arrays (FPGAs), one or more application specific integrated circuits (ASICs), and one or more application specific standard products (ASSPs). A control unit may also comprise memory, both static (e.g., hard drives or magnetic drives, optical drives, FLASH memory, EPROM, EEPROM, etc.) and dynamic (e.g., RAM, DRAM, SRAM, etc.), or any other non-transitory computer readable storage medium capable of storing instructions that cause the one or more processors to perform the efficient network management techniques described in this disclosure. Thus, a control unit may represent hardware or a combination of hardware and software to support the below described components, modules or elements, and the techniques should not be strictly limited to any particular example described below.

In some examples, computer-readable storage media and/or computer-readable storage devices may comprise non-transitory media and/or non-transitory devices. The term "non-transitory" may indicate that the storage medium is tangible and is not embodied in a carrier wave or a propagated signal. In certain examples, a non-transitory storage medium may store data that can, over time, change (e.g., in RAM or cache).

Various examples of the disclosure have been described. These and other examples are within the scope of the following claims.

What is claimed is:

1. A method comprising:
   receiving, by a computing device, an indication of input to select a sequence of three or more characters from a plurality of characters, wherein the plurality of characters is output by the computing device for display and the sequence of three or more characters includes no space characters;
   inserting, by the computing device and based at least in part on a lexicon, first and second space characters in respective first and second locations within the sequence of three or more characters to form a first modified sequence of characters, the first modified sequence of characters comprising at least three character substrings, wherein each of the at least three character substrings includes no space characters, and wherein the at least three character substrings are separated from one another in the first modified sequence of characters by one of the first or second space characters;
   determining, by the computing device and based at least in part on the first modified sequence of characters, one or more first suggested character strings;
   outputting, by the computing device and for display at a text-suggestion area of a graphical user interface, at least one suggested character string from the one or more first suggested character strings;
   determining whether an entry age of an initial character substring in the first modified sequence of characters is greater than a threshold value;
   responsive to determining that the entry age of the initial character substring in the first modified sequence of characters is greater than the threshold value, determining a second modified sequence of characters that includes each character substring from the first modified sequence of characters other than the initial character substring;
   determining, based at least in part on the second modified sequence of characters, one or more second suggested character strings to be displayed at the text-suggestion area of the graphical user interface, wherein the one or more second suggested character strings are different than the one or more first suggested character strings; and
   responsive to determining the one or more second suggested character strings, replacing, in the text-suggestion area of the graphical user interface, the at least one suggested character string from the one or more first suggested character strings with at least one suggested character string from the one or more second suggested character strings.

2. The method of claim 1, wherein determining the one or more first suggested character strings comprises at least one of: correcting an insertion error in a character substring from the at least three character substrings, correcting an omission error in the character substring, or correcting a misspelling in the character substring.

3. The method of claim 2, wherein correcting the insertion error in the character substring from the at least three character substrings, correcting the omission error in the character substring from the at least three character substrings, and correcting the misspelling in the character substring from the at least three character substrings are each based at least in part on at least one of the lexicon or an n-gram language model.

4. The method of claim 1, further comprising:
further responsive to determining the one or more second suggested character strings, outputting, for display in a text-entry area of the graphical user interface, at least a portion of the initial character substring.

5. The method of claim 1, wherein inserting the first and second space characters in the respective first and second locations within the sequence of three or more characters to form the first modified sequence of characters comprises:
generating a first character substring within the first modified sequence of characters such that the first character substring represents a current character substring; and
for each character from the sequence of three or more characters,
adding the character to the current character substring, and
responsive to determining that the character represents a terminal character of the current character substring:
inserting one of the first or second space characters into the first modified sequence of characters subsequent to the character; and
generating a subsequent character substring within the first modified sequence of characters such that the subsequent character substring represents the current character substring.

6. The method of claim 1, wherein inserting the first and second space characters in the respective first and second locations within the sequence of three or more characters to form the first modified sequence of characters comprises:
inserting, based at least in part on the lexicon, third and fourth space characters in respective third and fourth locations within the sequence of three or more characters to form an updated, first modified sequence of characters, the updated, first modified sequence of characters comprising at least three new character substrings, wherein:
each of the at least three new character substrings includes no space characters,
the at least three new character substrings are separated from one another in the updated, first modified sequence of characters by one of the third or fourth space characters, and
at least one of the third or fourth locations is different than each of the first and second locations;
determining, based at least in part on the updated, first modified sequence of characters, one or more new suggested character strings; and
outputting, for display, at least one new suggested character string from the one or more new suggested character strings.

7. The method of claim 1, further comprising outputting, for display, in a text-entry area of the graphical user interface, the sequence of three or more characters.

8. A computing device comprising:
at least one processor
configured to:
receive an indication of input to select a sequence of three or more characters from a plurality of characters, wherein the plurality of characters is output by the computing device for display and the sequence of three or more characters includes no space characters;
insert, based at least in part on a lexicon, first and second space characters in respective first and second locations within the sequence of three or more characters to form a first modified sequence of characters, the first modified sequence of characters comprising at least three character substrings, wherein each of the at least three character substrings includes no space characters, and wherein the at least three character substrings are separated from one another in the first modified sequence of characters by one of the first or second space characters;
determine, based at least in part on the first modified sequence of characters, one or more first suggested character strings;
output, for display at a text-suggestion area of a graphical user interface, at least one suggested character string from the one or more first suggested character strings;
determine whether an entry age of an initial character substring in the first modified sequence of characters is greater than a threshold value;
responsive to determining that the entry age of the initial character substring in the first modified sequence of characters is greater than the threshold value, determine a second modified sequence of characters that includes each character substring from the first modified sequence of characters other than the initial character substring;
determine, based at least in part on the second modified sequence of characters, one or more second suggested character strings to be displayed at the text-suggestion area of the graphical user interface, wherein the one or more second suggested character strings are different than the one or more first suggested character strings; and
responsive to determining the one or more second suggested character strings, replace, in the text-suggestion area of the graphical user interface, the at least one suggested character string from the one or more first suggested character strings with at least one suggested character string from the one or more second suggested character strings.

9. The computing device of claim 8, wherein the at least one processor is configured to determine the one or more first suggested character strings to correct at least one of: an insertion error in a character substring from the at least three character substrings, an omission error in the character substring, or a misspelling in the character substring.

10. The computing device of claim 9, wherein the at least one processor is further configured to:
determine, based at least in part on at least one of the lexicon or an n-gram language model, that at least one of: the insertion error is in the character substring from the at least three character substrings, the omission error is in the character substring from the at least three character substrings, or the misspelling is in the character substring from the at least three character substrings.

11. The computing device of claim 8, wherein
the at least one processor is further configured to:
further responsive to determining the one or more second suggested character strings, output, for display, in a text-entry area of the graphical user interface, at least a portion of the initial character substring.

12. The computing device of claim 8, wherein the at least one processor is configured to insert the first and second space characters in the respective first and second locations within the sequence of three or more characters to form the first modified sequence of characters by at least:
generating a first character substring within the first modified sequence of characters such that the first character substring represents a current character substring; and
for each character from the sequence of three or more characters,
adding the character to the current character substring, and
responsive to determining that the character represents a terminal character of the current character substring:
inserting one of the first or second space characters into the first modified sequence of characters subsequent to the character; and
generating a subsequent character substring within the first modified sequence of characters such that the subsequent character substring represents the current character substring.

13. The computing device of claim 8, wherein the at least one processor is configured to insert the first and second space characters in the respective first and second locations within the sequence of three or more characters to form the first modified sequence of characters by at least:
inserting, based at least in part on the lexicon, third and fourth space characters in respective third and fourth locations within the sequence of three or more characters to form an updated, first modified sequence of characters, the updated, first modified sequence of characters comprising at least three new character substrings, wherein:
each of the at least three new character substrings includes no space characters,
the at least three new character substrings are separated from one another in the updated, first modified sequence of characters by one of the third or fourth space characters, and
at least one of the third or fourth locations is different than each of the first and second locations;
determine, based at least in part on the updated, first modified sequence of characters, one or more new suggested character strings; and
output, for display, at least one new suggested character string from the one or more new suggested character strings.

14. A non-transitory computer-readable storage medium encoded with instructions that, when executed, cause at least one processor to:
receive an indication of input to select a sequence of three or more characters from a plurality of characters, wherein the plurality of characters is output by the computing device for display and the sequence of three or more characters includes no space characters;
insert, based at least in part on a lexicon, first and second space characters in respective first and second locations within the sequence of three or more characters to form a first modified sequence of characters, the first modified sequence of characters comprising at least three character substrings, wherein each of the at least three character substrings includes no space characters, and wherein the at least three character substrings are separated from one another in the first modified sequence of characters by one of the first or second space characters;
determine, based at least in part on the first modified sequence of characters, one or more first suggested character strings;
output, for display at a text-suggestion area of a graphical user interface, at least one suggested character string from the one or more first suggested character strings;
determine whether an entry age of an initial character substring in the first modified sequence of characters is greater than a threshold value;
responsive to determining that the entry age of the initial character substring in the first modified sequence of characters is greater than the threshold value, determine a second modified sequence of characters that includes each character substring from the first modified sequence of characters other than the initial character substring;
determine, based at least in part on the second modified sequence of characters, one or more second suggested character strings to be displayed at the text-suggestion area of the graphical user interface, wherein the one or more second suggested character strings are different than the one or more first suggested character strings; and
responsive to determining the one or more second suggested character strings, replace, in the text-suggestion area of the graphical user interface, the at least one suggested character string from the one or more first suggested character strings with at least one suggested character string from the one or more second suggested character strings.

15. The non-transitory computer-readable storage medium of claim 14, wherein the instructions, when executed, cause the at least one processor to determine the one or more first suggested character strings to correct at least one of: an insertion error in a character substring from the at least three character substrings, an omission error in the character substring, or a misspelling in the character substring.

16. The non-transitory computer-readable storage medium of claim 15, wherein the instructions, when executed, further cause the at least one processor to:
determine, based at least in part on at least one of the lexicon or an n-gram language model, that at least one of: the insertion error is in the character substring from the at least three character substrings, the omission error is in the character substring from the at least three character substrings, or the misspelling is in the character substring from the at least three character substrings.

17. The non-transitory computer-readable storage medium of claim 14, wherein
the instructions, when executed, further cause the at least one processor to:
further responsive to determining the one or more second suggested character strings, output, for display, in a text-entry area of the graphical user interface, at least a portion of the initial character substring.

* * * * *